(12) United States Patent
Kato et al.

(10) Patent No.: US 6,213,096 B1
(45) Date of Patent: Apr. 10, 2001

(54) FUEL SUPPLY FOR DIRECT INJECTED ENGINE

(75) Inventors: Masahiko Kato; Hiroaki Fujimoto, both of Shizuoka-ken (JP)

(73) Assignee: Sanshin Kogyo Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/274,562

(22) Filed: Mar. 23, 1999

(30) Foreign Application Priority Data

Mar. 25, 1998 (JP) .................................................. 10-077206
Mar. 25, 1998 (JP) .................................................. 10-077207
Mar. 25, 1998 (JP) .................................................. 10-077208

(51) Int. Cl.[7] .................................................. F02M 37/04
(52) U.S. Cl. ........................ 123/456; 123/509; 123/467
(58) Field of Search .................... 123/495, 509, 123/456, 446, 447, 467

(56) References Cited

U.S. PATENT DOCUMENTS

| | | | |
|---|---|---|---|
| 3,507,263 | * 4/1970 | Long | 123/456 |
| 5,505,181 | * 4/1996 | McRea | 123/467 |
| 5,884,607 | * 3/1999 | Schiller et al. | 123/467 |
| 5,890,472 | * 4/1999 | Saito | 123/509 |
| 5,934,251 | * 8/1999 | Jacobs | 123/467 |
| 5,954,031 | * 9/1999 | Ogiso et al. | 123/467 |
| 5,992,393 | * 11/1999 | Yoshida et al. | 123/509 |
| 6,009,855 | * 1/2000 | Espey | 123/509 |

* cited by examiner

Primary Examiner—Thomas N. Moulis
(74) Attorney, Agent, or Firm—Knobbe, Martens, Olson & Bear, LLP

(57) ABSTRACT

An improved fuel supply system for a direct injected engine accommodated in outboard motors includes a pump drive mechanism, instead of a camshaft, for driving a high pressure fuel pump. A pair of the high pressure fuel pumps is applied in one embodiment and a single one is applied in another embodiment. A pulsation damper is further provided for smoothing output of the fuel pump. The pump drive mechanism is unified with a fuel supply conduit, which has a plurality of fuel injectors, for increasing rigidity of components and affixed to the cylinder body of the engine. Openings on the cylinder head of the engine for accommodating the fuel injectors are larger than the injectors so that accumulated tolerances are absorbed by the gap made between the opening and the injector.

51 Claims, 15 Drawing Sheets

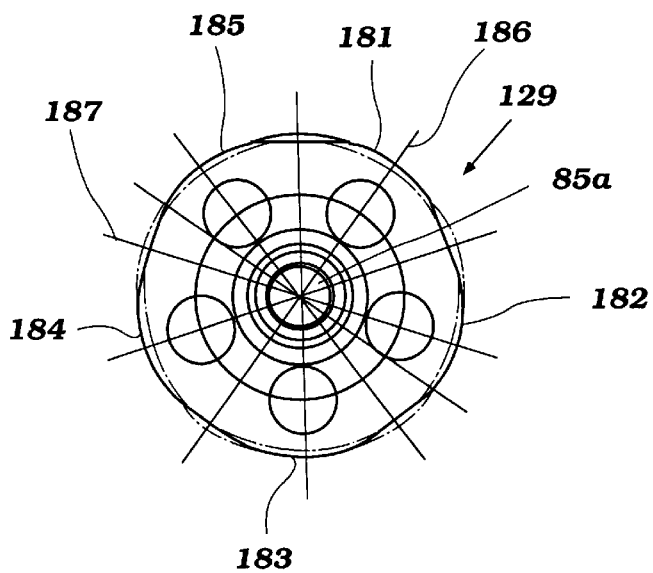
Figure 8
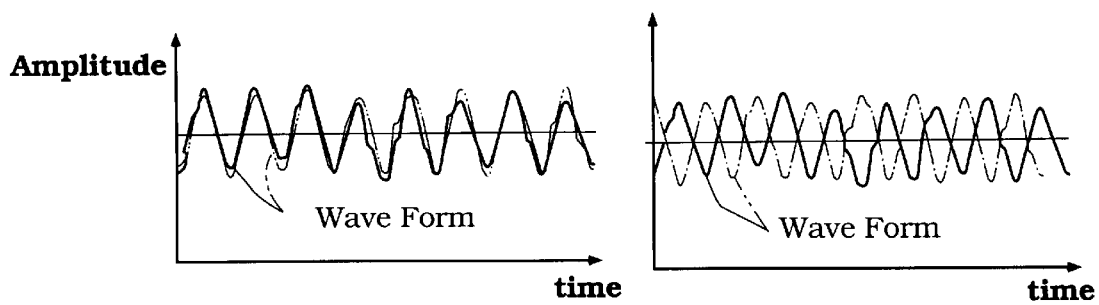
Figure 9(A)
Figure 9(C)
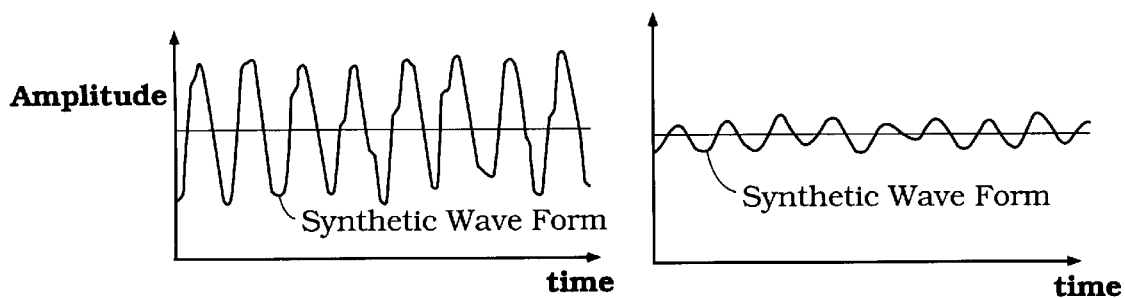
Figure 9(B)
Figure 9(D)

FUEL SUPPLY FOR DIRECT INJECTED ENGINE

BACKGROUND OF THE INVENTION

1. Field of the Invention

This invention relates to a fuel injected system for a direct injected engine and more particularly to an improved fuel supply arrangement for an outboard motor incorporating a direct injected system.

2. Description of Related Art

As is well known, in all fields of engine design there is an increasing emphasis on obtaining more effective emission control, better fuel economy and, at the same time, continued high or higher power output. This trend has resulted in the substitution of fuel injection systems for carburetors as the engine charge former. In the common systems used, fuel is injected into an intake air manifold. In order to obtain still further improvement, direct injection systems are being considered. These systems inject fuel directly into the combustion chamber and thus have significant potential advantages.

This direct injection, however, means that the pressure into which the fuel is injected is higher than with manifold injection systems wherein the pressure is at substantially atmospheric or even below. Electric pumps are not totally capable of supplying such high pressures.

In order to supply the necessary pressure for a direct cylinder injection, it has been proposed to employ a fuel supply system of the type used with manifold injection systems with the addition of a high pressure mechanical pump to supply the pressures required for direct cylinder injection. This is comprised of an engine driven pump which supplies fuel to a vapor separator in which the electrically operated fuel pump that is driven off the engine and which can generate higher pressures as required by the direct injection system. This type of system can be quite effective.

However, in connection with outboard motors, the direct injection system causes problems in other aspects.

Because of frequent use under high load and low speed conditions, engines for the outboard motors consume a large amount of fuel relative to other engines such as automobile engines. The larger the engines, the more the required fuel per unit time. It could be one idea to employ a single high pressure fuel pump that has large capacity of fuel supply. However, redevelopment of such a fuel pump is not much advantageous because it could be costly. Procurement of it from parts suppliers might be more difficult because this kind of fuel pump requires special specifications. In either case, if possible, a new fuel pump would be too bulky for being placed in a small space around the engine surrounded by a protective cowling and in addition it would take much time for the fuel pump to obtain reliability on components and parts.

It is, therefore, a principal object of this invention to provide a fuel supply arrangement that can supply sufficient fuel required by engines at all times without difficulties in obtaining suitable fuel pumps.

Further, conventional fuel pumps are usually driven by existing engine components such as a camshaft that is indispensable for four cycle engines. However, a number of outboard motors incorporate a two cycle engine that has no camshaft. In addition, only very small space is remained for employing new components around the engine that is surrounded by a cowling.

It is, therefore, another object of this invention to drive a fuel pump with another drive measure that replaces the camshaft in simple and compact nature.

For a direct fuel injected engine with multiple cylinders, a relatively long size fuel supply rail is attached to the plurality of fuel injectors. Because of the nature of its mechanical drive, the fuel pump is usually placed at the one end of the fuel supply rail. Due to this arrangement, the longer the distance from the fuel pump, the larger the fuel pulsation. The fuel injectors placed more remotely from the fuel pump in the fuel supply rail are most effected. Meanwhile, injection amounts are controlled based upon a fixed fuel pressure and time of injection varied in response to the requirements from the engine. Accordingly, fluctuations in fuel pressure caused by the pulsation give rise to incorrect controls and difficulties in control of emissions.

It is, therefore, still another object of this invention to improve accuracy of the injection control in multi-cylinder engines for outboard motors, but not limited.

Another problem arises in connection with accumulated tolerances. The direct injection system needs a number of components such as a high pressure fuel pump, a fuel supply conduit and fuel injectors except for a control unit. Usually, some of these components are unified together and form a fuel injection unit. Since each component has own tolerance, the unit holds accumulated tolerances and in addition the engine, on which the unit is mounted, itself contains accumulated tolerances also. Thus, if the fuel injection unit is mounted, for example, on a cylinder body with one part and on a cylinder head with another part, it is quite difficult to place fuel injectors at accurate positions due to the accumulated tolerances. This kind of difficulty may occur with other components of the unit also.

In automobile technology, for instance, these accumulated tolerances are absorbed with flexible members such as elastic pipes. However, because of the nature of its flexibility, it is difficult to assemble them with other components and in the assembling work skilled techniques are required. In addition, due to the flexibility, such members are somewhat inferior in rigidity or stiffness and tend to invite deterioration in endurance when much stress is exerted. Thus, these members are not suitable for outboard motors that generate much vibration therein relative to automobiles.

It is, therefore, yet another object of this invention to provide a mounting arrangement for direct injection components that can resolve the problem of accumulated tolerances and keep rigidity and endurance even used for outboard motors.

SUMMARY OF THE INVENTION

This invention is adapted to be embodied in a direct fuel injected system for a multi-cylinder internal combustion engine.

In accordance with one aspect of this invention, the fuel injection system includes a plurality of fuel injectors, a plurality of high pressure fuel pumps, a single fuel pump drive mechanism powered by the engine for driving the plurality of fuel pumps and a fuel supply conduit for supplying the fuel from the fuel pumps to the fuel injectors.

In accordance with another aspect of this invention, the fuel injection system includes a plurality of fuel injectors, a high pressure fuel pump, a fuel pump drive mechanism powered by the engine for driving the fuel pump and a fuel supply conduit for supplying the fuel from the fuel pump to the fuel injectors. The fuel pump is mounted on the pump drive mechanism.

In accordance with still another aspect of this invention, the fuel injection system includes a plurality of fuel injectors, a high pressure fuel pump, a fuel pump drive mechanism powered by the engine for driving the fuel pump, a fuel supply conduit for collecting the fuel from the fuel pump and supplying the fuel to the fuel injectors and a pulsation damper being placed in the fuel supply conduit.

This invention is also adapted to be embodied in a direct fuel injected system for a multi-cylinder internal combustion engine having a cylinder body and a cylinder head affixed to the cylinder body for defining a plurality of combustion chambers between them.

In accordance with yet another aspect of this invention, the fuel injection system includes a plurality of fuel injectors for injecting fuel into the combustion chambers, a fuel pump, a fuel pump drive mechanism powered by the engine for driving the fuel pump and a fuel supply conduit for collecting the fuel from the fuel pump and supplying the fuel to the fuel injectors. The cylinder head has a plurality of openings for accommodating the fuel injectors. The fuel injectors are affixed to the fuel supply conduit so that respective injectors are provided to respective combustion chambers. The fuel supply conduit is mounted on the cylinder body by means of the fuel pump drive mechanism. The respective openings are larger than the respective fuel injectors.

In accordance with still another aspect of this invention, the fuel pump and the fuel supply conduit both are mounted on the pump drive mechanism and the pump drive mechanism is mounted on a part of the engine.

Further aspects, features and advantages of this invention will become apparent from the detailed description of the preferred embodiments which follow.

BRIEF DESCRIPTION OF THE DRAWINGS

These and other features of the invention will now be described with reference to the drawings of preferred embodiments which are intended to illustrate and not to limit the invention, and in which:

FIG. 8 is a plan view of a cam disc that is provided on a pump drive mechanism.

FIG. 9 is a graphical view showing pulsations in fuel pressure from high pressure fuel pumps and more specifically, (A) wave forms both having the same phase, (B) the synthetic wave form made from the wave forms shown in (A), (C) wave forms either having different phases and (D) the synthetic wave form made from the wave forms shown in (C).

DETAILED DESCRIPTION OF THE PREFERRED EMBODIMENTS OF THE INVENTION

The general overall environment in which the invention is practiced and certain details of the engines will be described primarily by reference to FIG. 1 and additionally to FIGS. 2 through 7.

Figure 1:
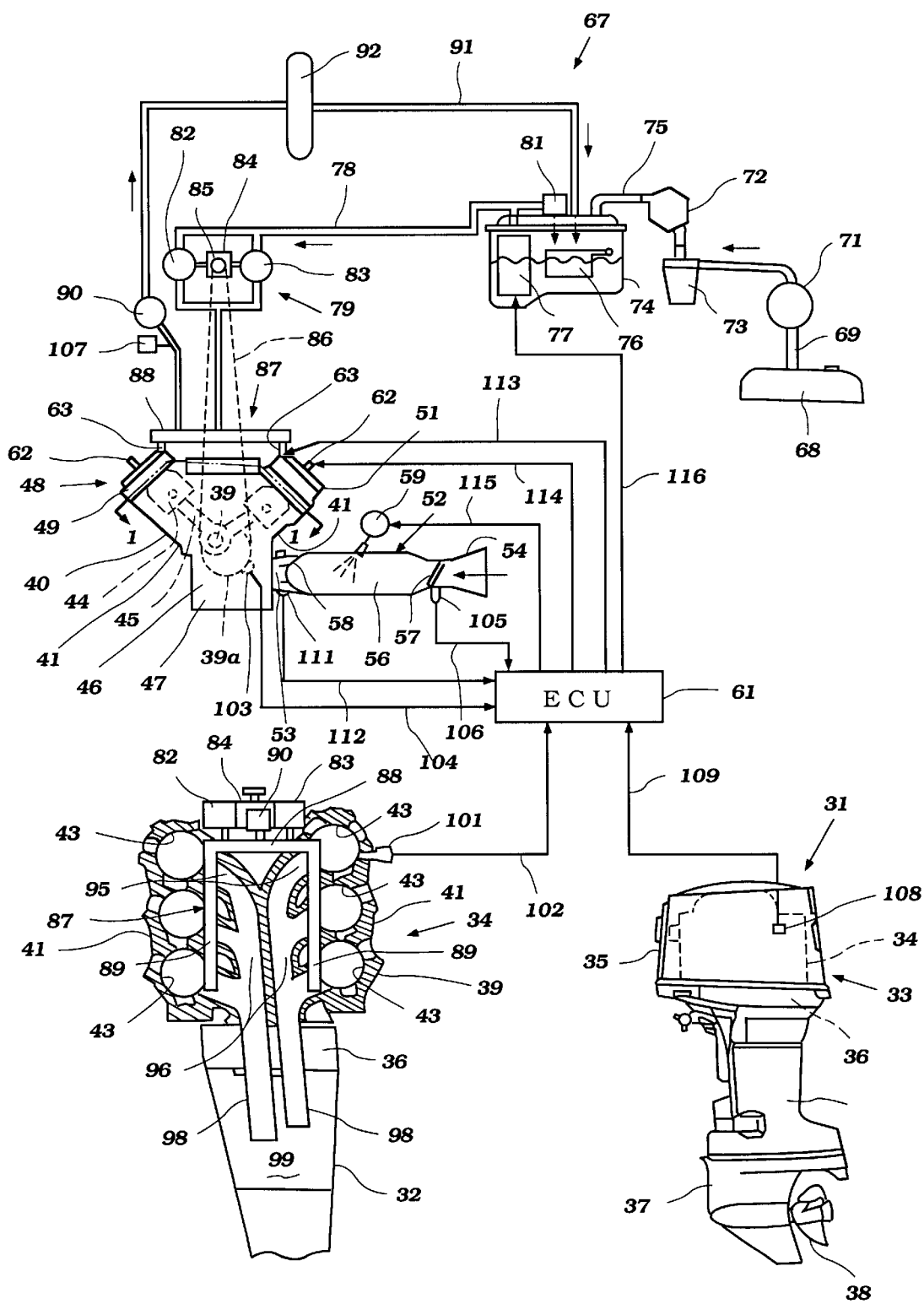
FIG. 1 is a multi-part view showing: in the lower right-hand portion, an outboard motor embodying the inventions; in the upper view, a partially schematic view of the engine of the outboard motor with its induction; in the lower left-hand portion, a rear elevational view of the outboard motor with portions removed and other portions broken away and shown in section along the line 1—1 in the upper view so as to more clearly show the construction of the engine; and fuel injection system shown in part schematically. An ECU (Electric Control Unit) for the motor links the three views together.

In the lower-right hand view of the FIG. 1, an outboard motor constructed and operated in accordance with an embodiment of the invention is depicted in side elevational view and is identified generally by the reference numeral 31.

The entire outboard motor 31 is not depicted in that the swivel bracket and clamping bracket that are associated with the driveshaft housing, indicated generally by the reference numeral 32, are not illustrated. This is because these components are well known in the art and the specific method by which the outboard motor 31 is mounted to the transom of an associated watercraft is not necessary to permit those skilled in the art to understand or practice the invention.

The outboard motor 31 includes a power head, indicated generally by the reference numeral 33, that is positioned above the driveshaft housing 32 and which includes a powering internal combustion engine, indicated generally by the reference numeral 34. This engine 34 is shown in more detail in the remaining two view of this figure and will be described shortly by reference thereto.

The power head 33 is completed by a protective cowling which includes a main cowling member 35. This main cowling member 35 is detachably connected to an exhaust guide 36 which is a lower tray portion and encircles an upper portion of the driveshaft housing 32.

Positioned beneath the driveshaft housing 32 is a lower unit 37 in which a propeller 38, which forms the propulsion device for the associated watercraft, is journaled.

As is typical with outboard motor practice, the engine 34 is supported in the power head 33 so that its crankshaft 39

(see the upper view) rotates about a vertically extending axis. This is done so as to facilitate connection of the connection of the crankshaft 39 to a driveshaft which depends into the driveshaft housing 32 and which drives the propeller 38 through a conventional forward, neutral, reverse transmission contained in the lower unit 37.

The details of the construction of the outboard motor and the components which are not illustrated may by considered to be conventional or of any type known to those wishing to utilize the invention disclosed herein. Those skilled in the art can readily refer to any known constructions with which to practice the invention.

Referring now in detail to the construction of the engine 34 still by primary reference to FIG. 1, in the illustrated embodiment, the engine 34 is of the V6 type and operates on a two stroke, crankcase compression principle. Although the invention is described in conjunction with an engine having this cylinder number and cylinder configuration, it will be readily apparent that the invention can be utilized with engines having other cylinder numbers and other cylinder configurations. Some features of the invention, however, have particular utility in connection with V-type engines.

Also, although the engine 34 will be described as operating on a two stroke principle, it will also be apparent to those skilled in the art that certain facets of the invention can be employed in conjunction with four stroke engines. In fact, some features of the invention also can be employed with rotary type engines.

The engine 34 is comprised of a cylinder block 40 that is formed with a pair of cylinder banks 41. Each of these cylinder banks is formed with three vertically spaced, horizontally extending cylinder bores 43. Pistons 44 reciprocate in these cylinder bores 43. The pistons 44 are, in turn, connected to the upper or small ends of connecting rods 45. The big ends of these connecting rods are journaled on the throws of the crankshaft 39 in a manner that is well known in this art.

The crankshaft 39 is journaled in a suitable manner for rotation within a crankcase chamber 46 that is formed in part by a crankcase member 47 that is affixed to the cylinder block 40 in a suitable manner. As is typical with two cycle engines, the crankshaft 39 and crankcase chamber 46 are formed with seals so that each section of the crankcase that is associated with one of the cylinder bores 43 will be sealed from the others. This type of construction is well known in the art.

A cylinder head assembly, indicated generally by the reference numeral 48, is affixed to the end of the cylinder banks 41 that are spaced from the crankcase chamber 46. These cylinder head assemblies 48 are comprised of a main cylinder head member 49 that defines a plurality of recesses 50 (FIGS. 5 and 6) in its lower face. Each of these recesses 50 corporate with the respective cylinder bore 43 and the head of the piston 44 to define the combustion chambers 50a (see FIGS. 4,5 and 6) of the engine. This is also well known in the art. A cylinder head cover member 51 completes the cylinder head assembly 48. The cylinder head members 49 and 51 are affixed to each other and to the respective cylinder banks 41 in a suitable, known manner.

Referring again primarily to FIG. 1, an air induction system, indicated generally by the reference numeral 52 is provided for delivering an air charge to the sections of the crankcase chamber 46 associated with each of the cylinder bores 43. This communication is via an intake port 53 formed in the crankcase member 47 and registering with each such crankcase chamber section.

The induction system 52 includes an air silencing and inlet device, shown schematically in this figure and indicated by the reference numeral 54. The actual construction of this air charge device appears in FIG. 2. In actual physical location, this device 54 is contained within the cowling 35 at the forward end thereof and has a rearwardly facing air inlet opening 55 through which air is introduced. Air is admitted into the interior of the cowling 35 in a known manner, and this is primarily through a pair of rearwardly positioned air inlet that have a construction as is generally well known in the art.

The air inlet device 54 supplies the induced air to a plurality of throttle bodies 56, each of which has a throttle valve 57 provided therein. These throttle valves 57 are supported on throttle valve shafts. These throttle valve shafts are linked to each other for simultaneous opening and closing of the throttle valves 57 in a manner that is well known in this art.

As is also typical in two cycle engine practice, the intake ports 53 have, provided in them, reed-type check valves 58. These check valves 58 permit the air to flow into the sections of the crankcase chamber 46 when the pistons 44 are moving upwardly in their respective cylinder bores. However, as the pistons 44 move downwardly, the charge will be compressed in the sections of the crankcase chamber 46. At that time, the reed type check valve 58 will close so as to permit the charge to be compressed. In addition, a lubricant pump 59 is provided for spraying lubricant into the throttle body 56 for engine lubrication under the control of an ECU (Electronic Control Unit) 61 that will be described more in detail later. Although it is not shown, some forms of direct lubrication may be also employed for delivering lubricant directly to certain components of the engine.

The charge which is compressed in the sections of the crankcase chamber 46 is then transferred to the combustion chamber 50a through a scavenging system (not shown) in a manner that is well known. A spark plug 62 is mounted in the cylinder head assembly 48 for each cylinder bore. The spark plug 62 is fired under the control of the ECU 61. This ECU 61 receives certain signals for controlling the time of firing of the spark plugs 62 in accordance with any desired control strategy.

The spark plug 62 fire a fuel air charge that is formed by mixing fuel directly with the intake air via a fuel injector 63. The fuel injectors 63 are solenoid type injectors and electrically operated. They are mounted directly in the cylinder head 49 in a specific location, as will be described, so as to provide optimum fuel vaporization under all running conditions.

Fuel is supplied to the fuel injectors 63 by a fuel supply system, indicated generally by the reference numeral 67 and which will be described first by reference to FIG. 1 and particularly the upper and lower left hand portions thereof.

The fuel supply system 67 is composed of a main fuel supply tank 68 that is provided in the hull of the watercraft with which the outboard motor 31 is associated. Fuel is drawn from this tank 68 through a conduit 69 by means of a first low pressure pump 71 and a plurality of second low pressure pumps 72. The first low pressure pump 71 is a manually operated pump and the second low pressure pumps 72 are diaphragm type pumps operated by variations in pressure in the sections of the crankcase chamber 46, and thus provide a relatively low pressure.

A quick disconnect coupling is provided in the conduit 69 and also a fuel filter 73 is positioned in the conduit 69 at an appropriate location.

From the low pressure pump 72, fuel is supplied to a vapor separator 74 which is mounted on the engine 34 or within the cowling 35 at an appropriate location. This fuel is supplied through a line 75, there is provided at a float valve that is operated by a float 76 so as to maintain a uniform level of fuel in the vapor separator 74.

A high pressure electric fuel pump 77 is provided in the vapor separator 74 and pressurizes fuel that is delivered through a fuel supply line 78 to a high pressure pumping apparatus, indicated generally by the reference numeral 79. The electric fuel pump 77, which is driven by an electric motor, develops a pressure such as 3 to 10 kg/cm$^2$. A low pressure regulator 81 is positioned in the line 78 at the vapor separator 74 and limits the pressure that is delivered to the high pressure pumping apparatus 79 by dumping the fuel back to the vapor separator 74.

The high pressure fuel delivery system 79 includes a pair of high pressure fuel pumps 82 and 83 that can develop a pressure of, for example, 50 to 100 kg/cm$^2$ or more. The respective high pressure fuel pumps 82 and 83 have a regular capacity. Although the utilization of the regular size pumps does not require any new development of a large size fuel pump, a new drive mechanism for driving the two pumps 82 and 83 is necessary. A pump drive mechanism or unit 84 is provided in the high pressure fuel delivery system 79 for the purpose. A pulley 85 is affixed to a pump drive shaft 85a (see FIG. 2) of the pump drive unit 84. The pulley 85 is driven from a driving pulley 39a affixed to the crankshaft 39 by means of a drive belt 86. Constructions of the high pressure fuel pumps 82, 83 and pump drive unit 84 will be described in more detail later by reference to FIGS. 2 to 4 and 7 to 9.

Fuel is supplied from the high pressure fuel pumps 82 and 83 to a fuel supply conduit 87. This fuel supply conduit 87 is comprised of a main fuel manifold 88 that extends horizontally. The main fuel manifold 88, in turn, delivers fuel to a pair of vertically extending fuel rails 89. This construction, connection and the manner of delivery of fuel will be described later by particular reference to FIGS. 3 and 7. The fuel rails 89 deliver fuel to the fuel injectors 63 in a manner which will be described later by detailed reference also to FIGS. 3 and 7.

The pressure in the high pressure delivery system 79 is regulated by a high pressure regulator 90 which dumps fuel back to the vapor separator 74 through a pressure relief line 91 in which a fuel heat exchanger or cooler 92 is provided.

After the fuel charge has been formed in the combustion chamber 50a by the injection of fuel from the fuel injectors 63, the charge is fired by firing the spark plugs 62. The injection timing and duration, as well as the control for the timing of firing of the spark plugs 62, are controlled by the ECU 61.

Once the charge burns and expands, the pistons 44 will be driven downwardly in the cylinder bores until the pistons 44 reach the lowermost position. At this time, an exhaust port (not shown) will be uncovered so as to open the communication with an exhaust passage 95 (see the lower left-hand view) formed in the cylinder block 39.

The exhaust gases flow through the exhaust passages 95 to collector sections 96 of respective exhaust manifolds that are formed within the cylinder block 39. These exhaust manifold collector sections 96 communicate with exhaust passages formed in an exhaust guide plate 36 on which the engine 34 is mounted.

A pair of exhaust pipes 98 depends from the exhaust guide plate 36 and extend the exhaust passages 96 into an expansion chamber 99 formed in the driveshaft housing 32. From this expansion chamber 99, the exhaust gases are discharged to the atmosphere through a suitable exhaust system. As is well known in outboard motor practice, this may include an underwater, high speed exhaust gas discharge and an above the water, low speed exhaust gas discharge. Since these types of systems are well known in the art, a further description of them is not believed to be necessary to permit those skilled in the art to practice the invention.

Although any type of desired control strategy can be employed for controlling the time and duration of fuel injection from the injector 63 and timing of firing of the spark plug 62, it will be apparent from the following description that there is some significance in injector timing to improve good fuel vaporization under difficult running conditions. However, a general discussion of some engine conditions that may be sensed and some other ambient conditions that can be sensed for engine control will follow. It is to be understood, however, that those skilled in the art will readily understand how various control strategies can be employed in conjunction with the components of the invention.

Preferably, the control for the fuel air ratio includes a feed back control system. Thus, a combustion condition or oxygen sensor 101 is provided that senses the in-cylinder combustion conditions by sensing the residual amount of oxygen in the combustion products at a time near the time when the exhaust port is opened. This output is indicated schematically at 102 to the ECU 61.

There is provided also associated with the crankshaft 39 a crank angle position sensor 103 which when measuring crank angle versus time and output an engine speed signal, indicated schematically at 104. Engine load, as determined by throttle angle of the throttle valve 57, is sensed by a throttle position sensor 105 which outputs a throttle position or load signal 106 to the ECU 61.

There is also provided a pressure sensor 107 in line connected to the pressure regulator 90. This pressure sensor 107 outputs the high pressure fuel signal to the ECU 61 (signal line is omitted).

There also may be provided a water temperature sensor 108 (see the lower right-hand view) which outputs a cooling water temperature signal 109 to the ECU 61.

Further, an intake air temperature sensor 111 (see the upper view) is provided and this sensor 111 outputs an intake air temperature signal 112 to the ECU 61.

The sensed conditions are merely some of those conditions which may be sensed for engine control and it is, of course, practicable to provide other sensors such as an engine height sensor, a trim angle sensor, a knock sensor, a neutral sensor, a watercraft pitch sensor and an atmospheric temperature sensor in accordance with various control strategies.

The ECU 61, as has been noted, outputs signals to the fuel injector 63, spark plug 62, the lubrication pump 59 and the high pressure electric fuel pump 77 for their respective control. These control signals are indicated schematically in FIG. 1 at 113, 114, 115 and 116, respectively.

Referring now to FIGS. 2 through 8, a construction, connection and mounting structure of the aforenoted components including the high pressure pumping apparatus 79, the fuel supply conduit 87 and the high pressure regulator 90 will be described in more detail.

Figure 2:
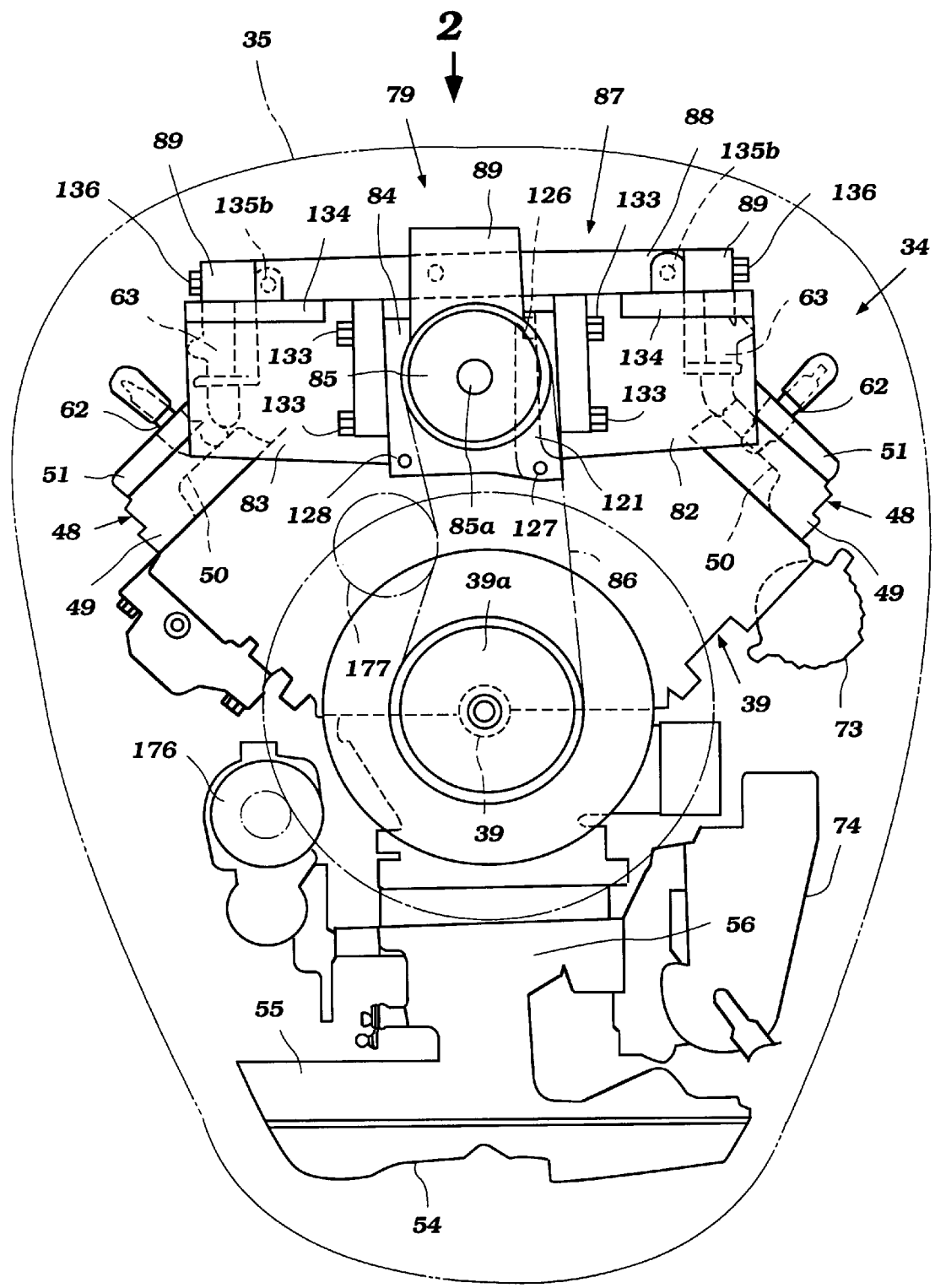
FIG. 2 is a top plan view of the power head showing the engine in solid lines and the protective cowling in phantom.
Figure 3:
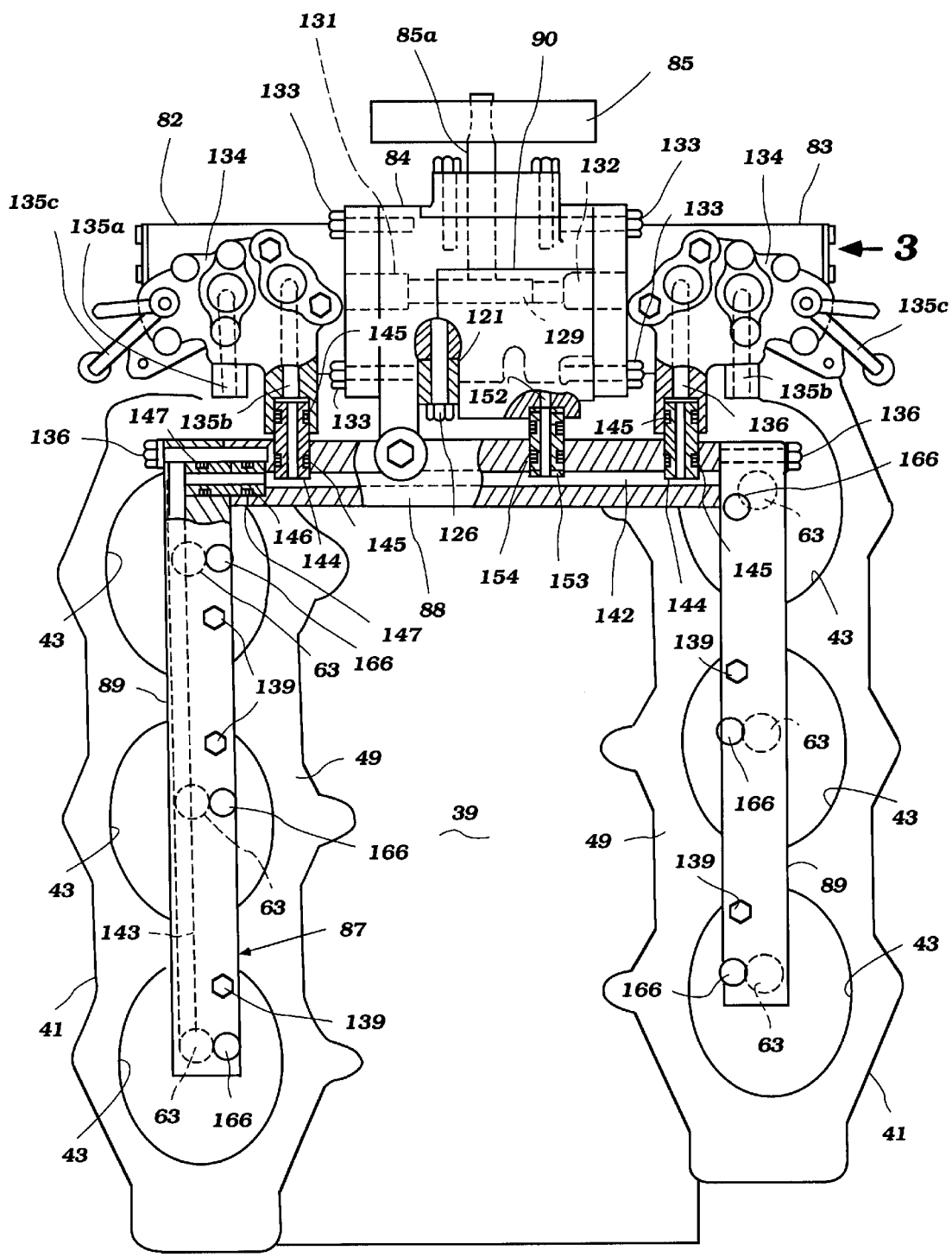
FIG. 3 is a rear elevational view of the engine showing partly in cross-section and is taken generally in the direction of 2 in FIG. 2.
Figure 4:
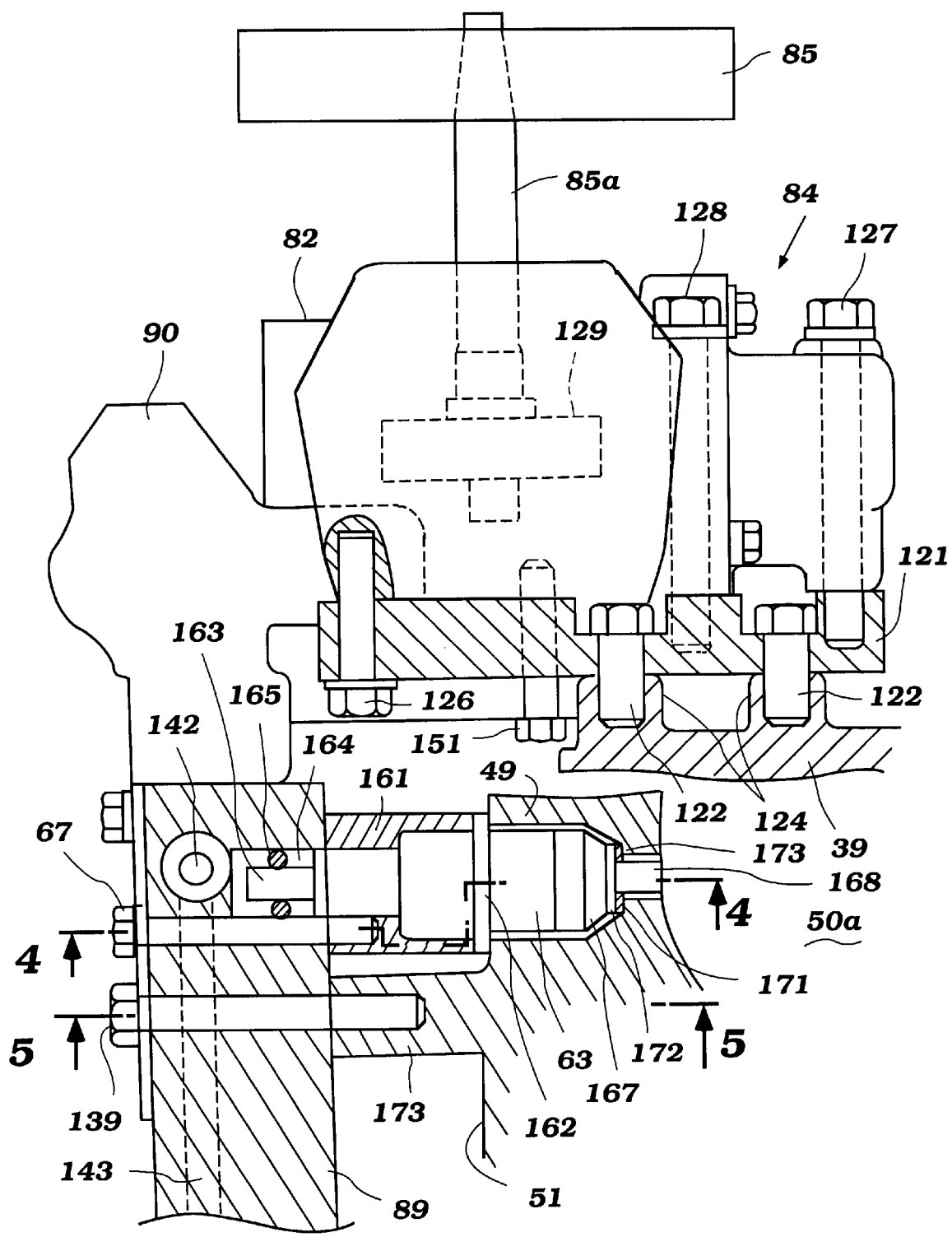
FIG. 4 is an enlarged elevational view of the engine showing the state wherein one fuel pump is removed, partly in cross-section, and is taken generally in the direction of the arrow 3 in FIG. 3.
Figure 5:
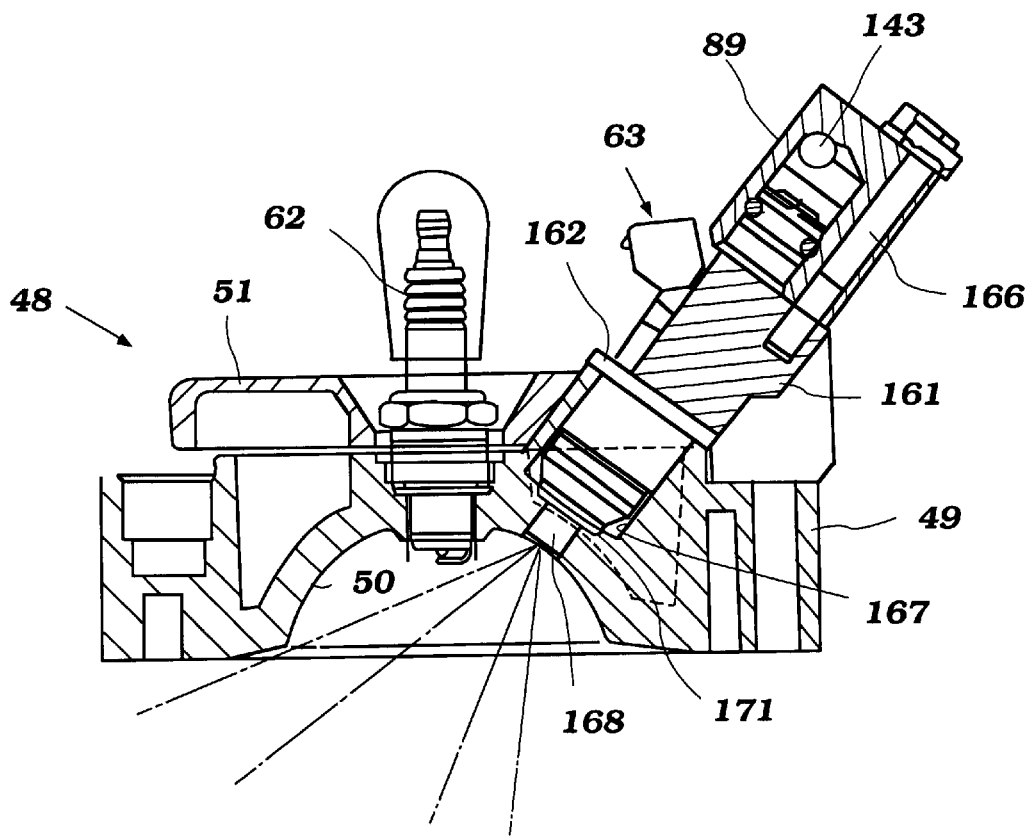
FIG. 5 is a cross-sectional view of a cylinder head assembly and is taken along the line 4—4 in FIG. 4.
Figure 6:
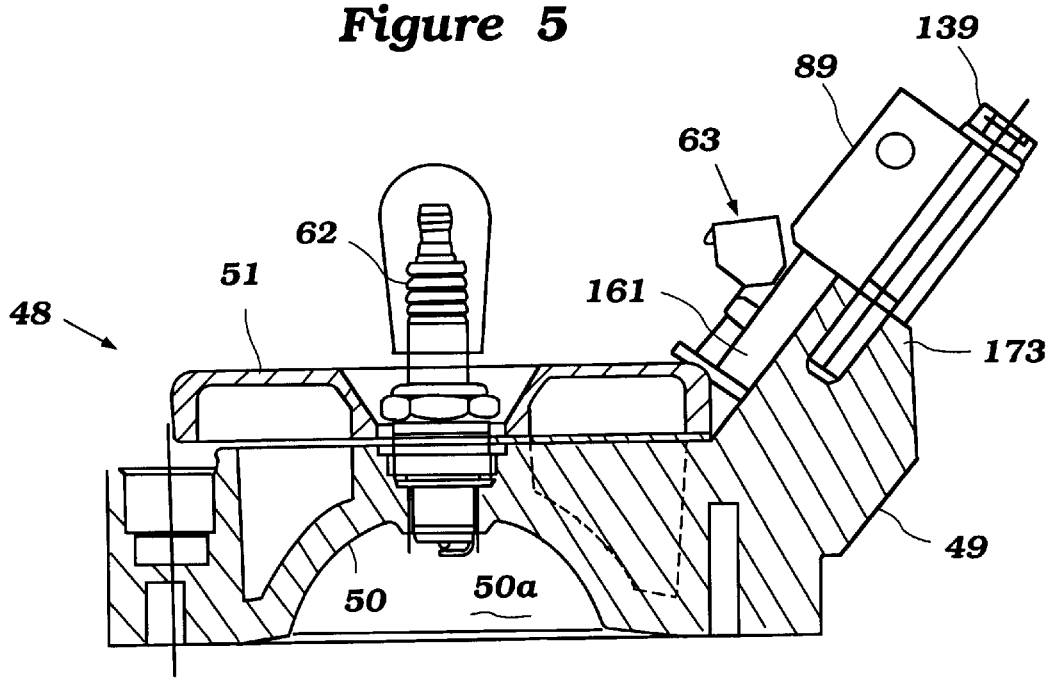
FIG. 6 is also a cross-sectional view of the cylinder head assembly taken along the line 5—5 in FIG. 4.
Figure 7:
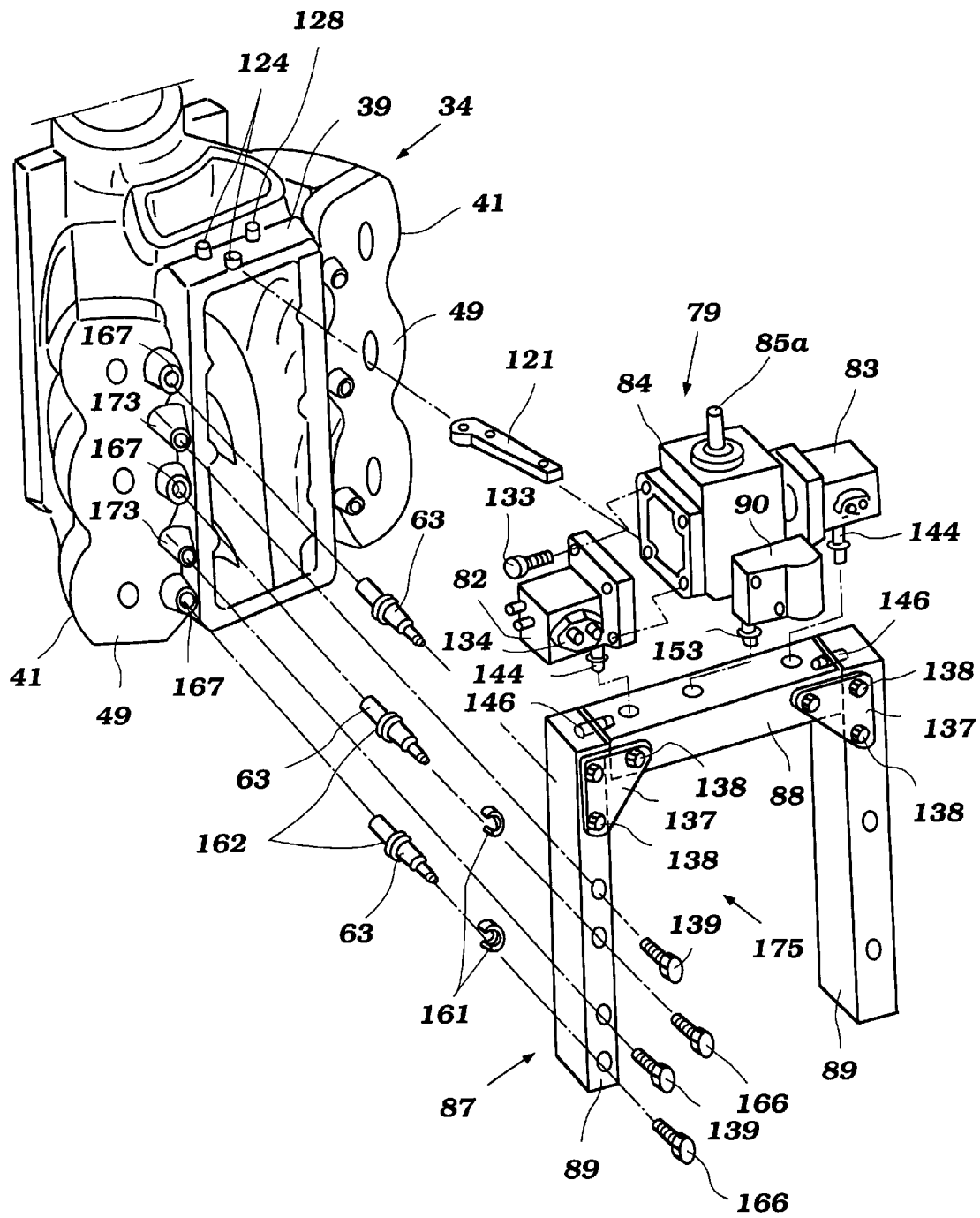
FIG. 7 is a perspective view showing related components exploded from the engine.

FIG. 2 is a top plan view of the power head 33 accommodating the engine 34 showing the engine 34 in solid lines and the cowling 35 in phantom. FIG. 3 is a rear elevational view of the engine 34 showing partly in cross-section and is taken generally in the direction of the allow 2 in FIG. 2. FIG. 4 is an enlarged elevational view of the engine 34 showing the state wherein the fuel pump 83 is removed, partly in cross-section, and is taken generally in the direction of the arrow 3 in FIG. 3. FIG. 5 is a cross-sectional view of the cylinder head assembly 48 and is taken along the line 4—4 in FIG. 4. FIG. 6 is also a cross-sectional view of the cylinder head assembly 48 taken along the line 5—5 in FIG. 4. FIG. 7 is a perspective view showing related components exploded from the engine 34.

As aforedescribed, in the pump drive unit 84 of the high pressure pumping apparatus 79, the driving pulley 39a is mounted on the crankshaft 39, while the driven pulley 85 is mounted on the pump drive shaft 85a of the pump drive unit 84. The driving pulley 39a drives the driven pulley 85 by means of the drive belt 86. The pair of high pressure pumps 82, 83 are mounted on either side of the pump drive unit 84 and driven by the unit 84 in a manner described shortly.

A stay 121 is affixed to the cylinder body 39 with bolts 122 at bosses 124 so as to extend from the cylinder body 39 and between both cylinder banks 41. The pump drive unit 84 is then partly affixed to the stay 121 with bolts 126, 127 and partly directly affixed to a boss 128 of the cylinder body 39 so that the pump drive unit 84 is mounted on the cylinder body 39 as overhanging between the two banks 41 of the V arrangement.

The rotational axis 85a of the pump drive unit 84 has a cam disc 129 existing horizontally and it will be described more in detail later with FIGS. 6 and 7. The cam disc 129 is provided for pushing plungers 131 and 132 which are disposed on the high pressure pumps 82 and 83, respectively.

The high pressure pumps 82 and 83 are mounted on the pump drive unit 84 with bolts 133 at both side of the pump drive unit 84. In this regard, a diameter of the bolt receiving openings on the pump drive unit 84 is slightly larger than a diameter of the bolts 133. Thus, the mounting condition of the high pressure pumps 82 and 83 on the pump drive unit 84 is adjustable within a gap made between the opening and the bolt 133. The respective high pressure pumps 82 and 83 have unified fuel inlet and outlet modules 134 which are mounted on respective side walls of the pressure pumps 82 and 83. The inlet and outlet modules 134 have an inlet passage 135a connected with the line 78 (FIG. 1), an outlet passage 135b connected with the fuel supply conduit 87 and an overflow passage 135c connected with the vapor separator 74 (FIG. 1). The line for returning the overflow fuel to the vapor separator 74 is omitted in FIG. 1.

The fuel supply conduit 87 is comprised of the main manifold 88 and the pair of fuel rails 89 depending from both ends of the main manifold 88. The fuel rails 89 are affixed to the main manifold 88 with bolts 136. Triangle plates 137 and bolts 138 (FIG. 7) are also provided for affixing the fuel rails 89 to the main manifold 88. The respective fuel rails 89 are affixed to both of the cylinder heads 49 with bolts 139. The bolts 139 are placed in the proximity to the fuel injectors 63. Other bolts may of course be provided, for instance, at the middle positions of two fuel injectors 63 in addition to the bolts 139. Thus, the fuel supply conduit 87 is mounted on the engine 34 by means of the pump drive unit 84 via the stay 121, partly directly, at the cylinder body 40 and by means of fuel rails 89 at the cylinder head 49. The connecting structure of the fuel rails 89 with the cylinder head 49 will be described more in detail later.

The main manifold 88 and the fuel rails 89 are hollow tubes and hollows therein form fuel passages 142 and 143. The fuel passage 142 in the main manifold 88 and the fuel passages 143 in both of the fuel rails are connected with each other. The respective outlet passages 135 of the fuel inlet and outlet modules 134 are connected to the fuel passage 142 of the main manifold 88 with connectors 144 around which are sealed with O-shaped elastic (rubber) rings 145. The main manifold 88 and the fuel rails 89, in turn, are connected with connectors 146 around which are sealed with the same O-shaped elastic rings 147 also.

The pressure regulator 90 is also mounted on the pump drive unit 84 with bolts 151 (FIG. 4). The pressure regulator 90 has a passage 152 therein that forms a part of the pressure relief line 91 (FIG. 1) and this passage 152 is connected with the fuel passage 142 in the main manifold 88 with a connector 153 around which is also sealed with an O-shaped elastic (rubber) ring 154.

The fuel injectors 63 are provided between the fuel rails 89 and the cylinder head 49 in the following manner. As best seen in FIG. 4, a horseshoe shaped spacers 161 are disposed between flanges 162 formed around the fuel injectors 63 and the fuel rails 89. The rear ends 163 of the fuel injectors 63 are placed in small chambers 164 with O-shaped elastic (rubber) rings 165. The small chambers 164 are connected to the fuel passage 143. The spacers 161 are affixed to the fuel rails 89 with bolts 166 and the fuel injectors 63 are affixed to the fuel rails 89 by means of the connections. It is desirable to dispose the bolts 166 as much closer to the fuel injectors 63 as possible for secure fixing of the fuel injectors 63.

The fuel injectors 63 are, then, inserted into openings 167 which are provided on the cylinder head 49 so that nozzles 168 of the fuel injectors 63 face onto the combustion chambers 50a aforenoted. The opening 167 is larger than the diameter of a fuel injector portion that is placed in the opening 167 so that the positioning of the fuel injector 63 in the opening 167 is adjustable. More specifically, there is a gap between the opening 167 and the portion of the fuel injector 63. A seal member 171 which is made of metal, such as a disc spring, is provided between a shoulder 172 of the fuel injector 63 and a step 173 formed in the opening 167 to have the shoulder 172 seated. The reason why the metal seal member 171 is used for sealing here is that the combustion gases have an extremely high pressure and high temperature.

Then, the fuel rails 89 are fixed to bosses 173 formed on the outer surface of the both cylinder heads 49 with the bolts 139. The sub-assembled unit including the fuel supply conduit 87, the high pressure pumping apparatus 79 (the high pressure pumps 82 and 83, the pump drive unit 84), pressure regulator 90 and the fuel injectors 63 forms a high pressure fuel injection unit 175 (FIG. 7).

In addition, a starter motor 176 for starting the engine 34 and a tensioner 177 for giving tension to the belt 86 are provided (FIG. 2).

Referring now primarily to FIG. 7, an assembling process will be described hereunder.

First of all, the stay 121 is fixed to the cylinder body 39. Next, the main manifold 88 and both of the fuel rails 88 are jointed and further the fuel injectors 63 are fixed to the fuel rails so that the fuel supply conduit 87 is completed. The pump drive unit 84 onto which the high pressure pumps 82, 83 and the pressure regulator 90 are already mounted is fixed to the fuel supply conduit 87. Then, the connectors 144 coming down from the inlet and outlet modules 134 attached to the high pressure pumps 82 and 83 are connected to the fuel passage 142 of the main manifold 88. Also, the connector 153 coming down from the pressure regulator 90 is connected to the fuel passage 142. Thus, the high pressure fuel injection unit 175 is completed.

The fuel injectors 63 are, then, inserted into the openings 167 of the cylinder heads 49 and the fuel rails 89 are temporarily fixed to the cylinder heads 49. Meanwhile, the pump drive unit 40 is also temporarily fixed to the cylinder body 39, partly via the stay 121 and partly directly.

In conventional mounting and affixing processes, generally, the fuel injectors 63 are not easily placed in the desired positions due to accumulated tolerances. As described above, however, in this embodiment, there is a gap between the fuel injectors 63 and the opening 167 and also between the bolt 133 and bolt receiving openings formed on the pump drive unit 84 made by the diameter differences thereof. Accordingly, the fuel injectors 63 are easily positioned as desired. Finally, the high pressure fuel injection unit 175 is fully fixed to the engine 34. By this final fixing, the metal seal members 171 placed around the nozzles 168 of the fuel injectors 63 are pressed to both of the shoulder portions 172 of the fuel injectors 63 and the step portions 173 of the openings 167 so as to securely prevent combustion gases from leaking through the openings 167.

Referring particularly to FIGS. 8 and 9, an operation of the high pressure pumps 82 and 83 will now be described.

FIG. 8 is a plan view of the cam disc 129. FIG. 9 is a graphical view showing delivery pulsations in pressure from the high pressure pumps 82 and 83 and more specifically, (A) wave forms both having the same phase, (B) the synthetic wave form made from the wave forms shown in (A), (C) wave forms either having different phases and (D) the synthetic wave form made from the wave forms shown in (C).

The cam disc 129 has five cams 181, 182, 183, 184 and 185 disposed radially at the periphery thereof. As clearly seen in FIG. 8, only one cam is placed on a line passing through the center of the cam disc 129 (the center of the pump driveshaft 85a). For example, a line 186 has only the cam 181 and also another line 187 has only the cam 182. The number of cams needed in this arrangement are at least three and odd numbers.

The rotation of the crankshaft 38 is transferred to the pump driveshaft 85a by means of the driving belt 86 and thus the pump driveshaft 85a rotates. With the rotation of the pump driveshaft 85a, the cam disc 129 also rotates and the respective cams 181, 182, 183, 184 and 185 push the plunger 131 of the pump 82 and the plunger 132 of the other pump 83 alternately. The alternate operations of the plungers 131 and 132 are caused by the arrangement of cams 181, 182, 183, 184 and 185 as described above and reduce the delivery pulsations in fuel pressure.

This reduction of the delivery pulsations is clearly understood by comparing the left hand graphs (A), (B) and the right hand graphs (C), (D) in FIG. 7. If phases of two wave forms are the same as seen in the graph (A), the synthetic wave form has the almost doubled amplitude. However, if phases of two wave forms are deviated with each other like the cam arrangement in the cam disc 129, the synthetic wave form has a smaller amplitude than the original wave forms.

It should be noted that a plurality of cam discs are applicable instead of the single cam disc 129. In preparing these cam discs, it is also preferable to dispose respective cams in deviated relationships that are in the aforenoted principle.

Another problem regarding the delivery pulsation occurs in connection with multiple cylinders as described before. A multi-cylinder engine requires a relatively long size fuel supply rail to deliver fuel to all of the cylinders. The problem is that the longer the distance from a fuel pump, the larger the delivery pulsation.

In order to resolve this problem, a pulsation damper is placed in the fuel supply rail. Another embodiment that incorporates this pulsation damper will be described by referring to FIGS. 10, 11 and 12. Since most part of these FIGS. 10, 11 and 12 show the same components and members disclosed in FIGS. 1, 2 and 3, respectively, no further descriptions on them are made by assigning the same reference numerals thereto so as to avoid redundancy.

Figure 10:
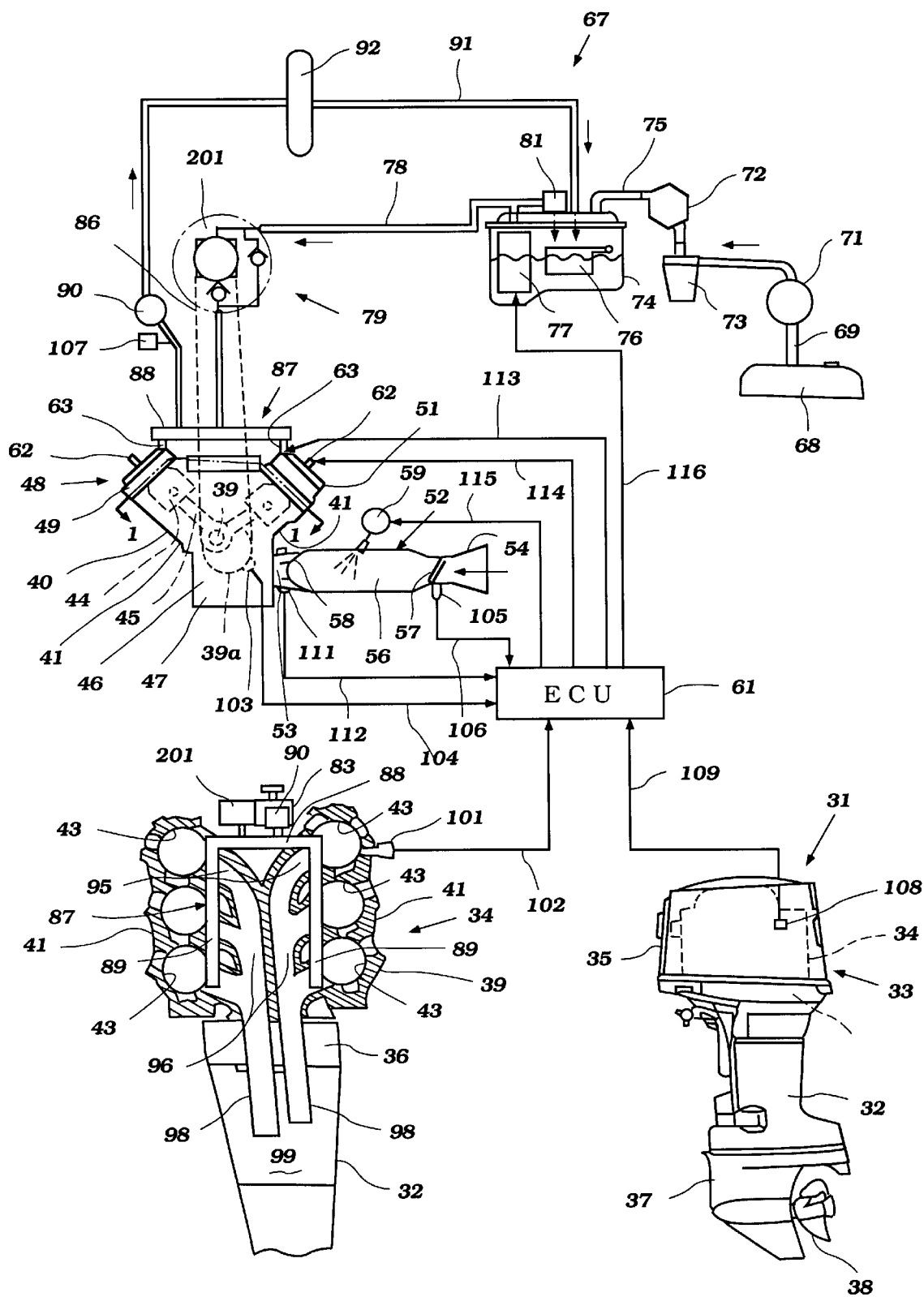
FIG. 10 is a multi-part view showing another outboard motor similarly as in FIG. 1.
Figure 11:
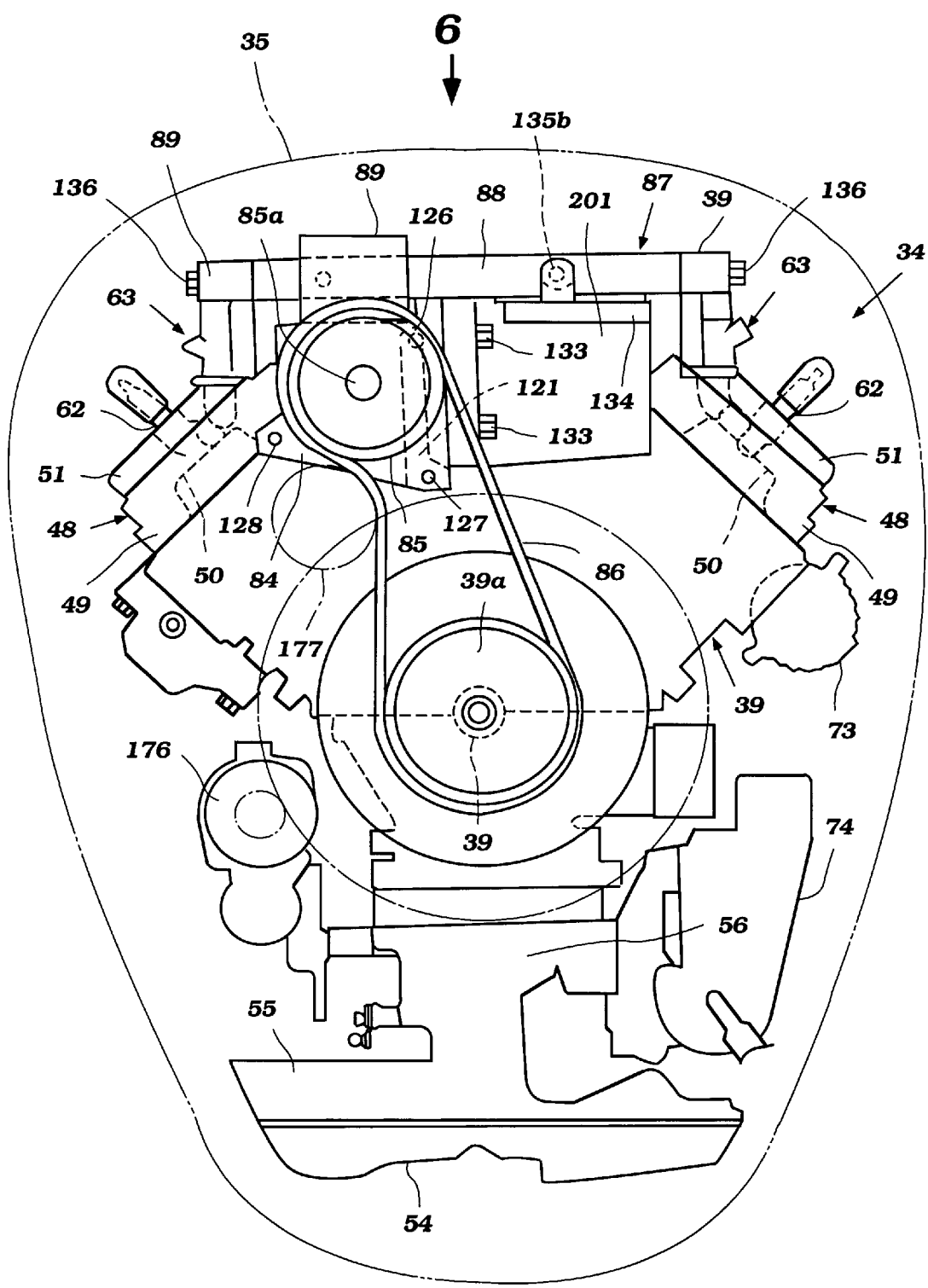
FIG. 11 is a top plan view of the power head accommodated in the outboard motor in FIG. 10 showing the engine in solid lines and the protective cowling in phantom.
Figure 12:
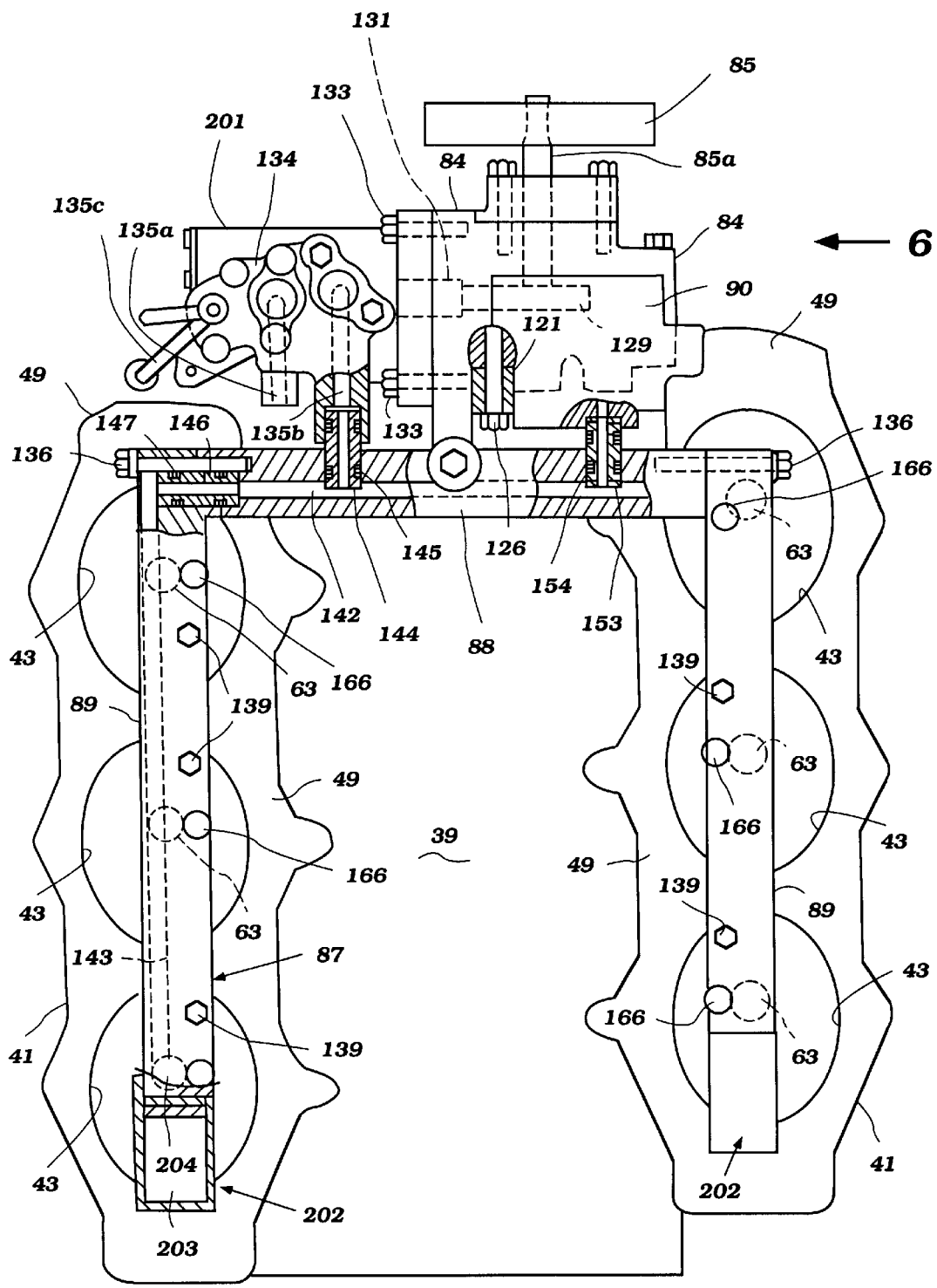
FIG. 12 is a rear elevational view of the engine in FIGS. 10 and 11 showing partly in cross-section and is taken generally in the direction of 6 in FIG. 11.

FIGS. 10, 11 and 12 show a fuel supply system that is equipped with a single high pressure pump replacing the pair of high pressure pumps in FIGS. 1, 2 and 3. However, the pulsation damper which now will be described is, of course, applicable to the fuel supply system shown in FIGS. 1, 2 and 3 also.

The single high pressure fuel pump is indicated with the reference numeral 201 and other components and members are indicated with the same reference numerals used for the high pressure fuel pump 82 in FIGS. 1, 2 and 3. Resonators 202 as the pulsation damper are attached to the lowermost ends of respective fuel rails 89 with an appropriate fixing measure such as a screwed connection, gluing and press fitting. In other words, the resonators 202 are located at the farthest positions from the fuel pump 201. The resonator 202 has a construction that comprises a chamber 203 which has a certain capacity and an orifice 204 through which the chamber 203 communicates with the fuel passage 143 in the fuel rail 89 (FIG. 12). Because of this construction, the positive part of the pulsation pressure is received by the capacity of the chamber 203 and the negative part of the pulsation pressure is compensated by the pressure existing in the chamber 203. Thus, the fuel pressure in the fuel passage 143 can be almost smoothed at all time.

It should be noted that an accumulator which is filled with pressurized air can replace the resonator 202 as the pulsation damper.

Figure 13:
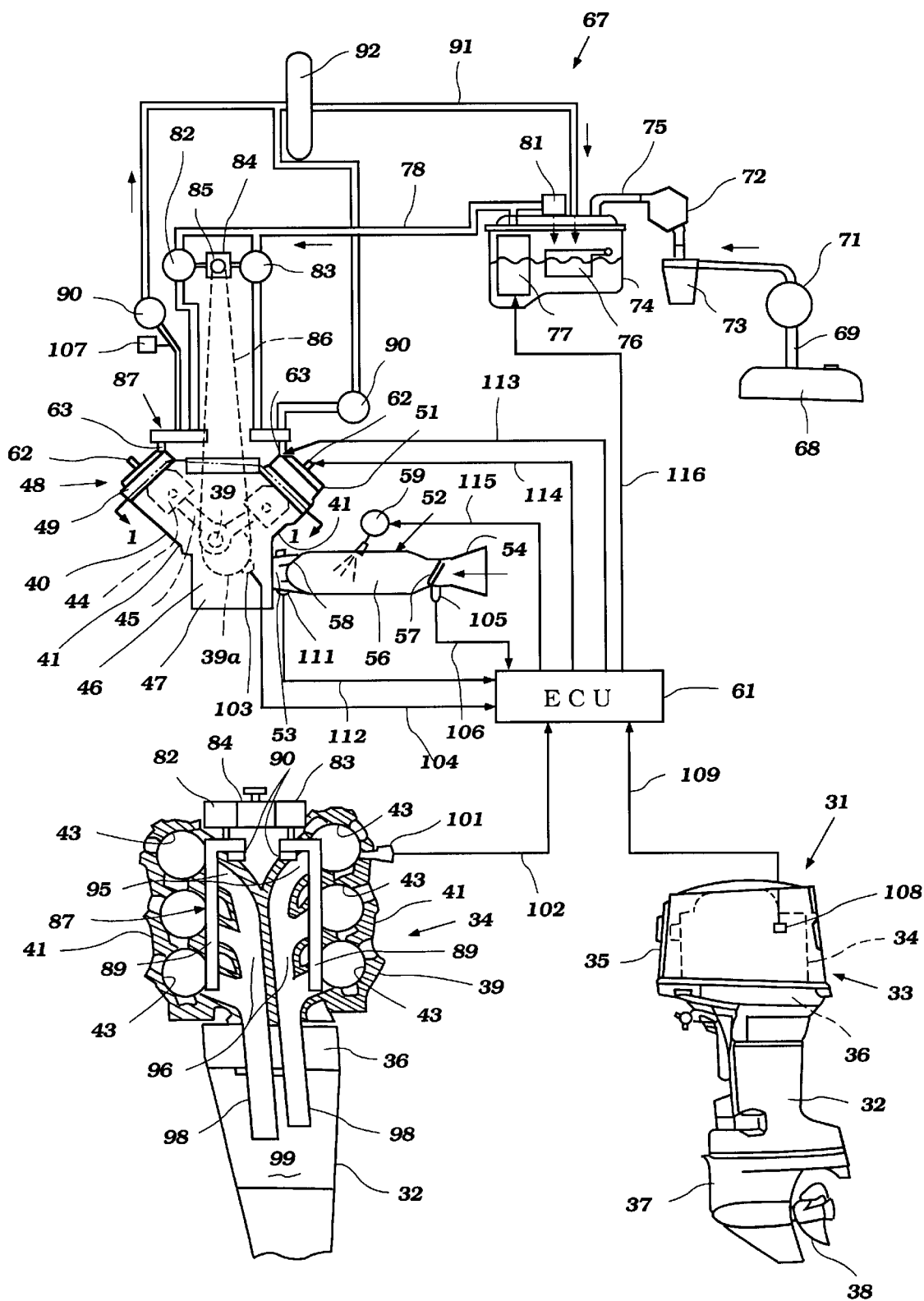
FIG. 13 is a multi-part view showing still another outboard motor similarly as in FIGS. 1 and 10.

FIG. 13 illustrates still another preferred embodiment. The same components or members as described in connection with the arrangement illustrated in FIG. 1 are assigned with the same reference numerals so as to avoid redundancy.

In this preferred embodiment, the fuel supply conduit 87 has no main manifold. The respective fuel rails 89 depend from the respective high pressure fuel pumps 82 and 83. A pair of pressure regulators 90 are provided on the respective fuel rails 89 at positions in proximity to the respective fuel pumps 82 and 83. Because of this arrangement, the respective fuel rails 89 do not affect to each other in the aforenoted problem of the fuel delivery pulsation. Thus, the total delivery pulsation can be reduced further in this embodiment.

Figure 14:
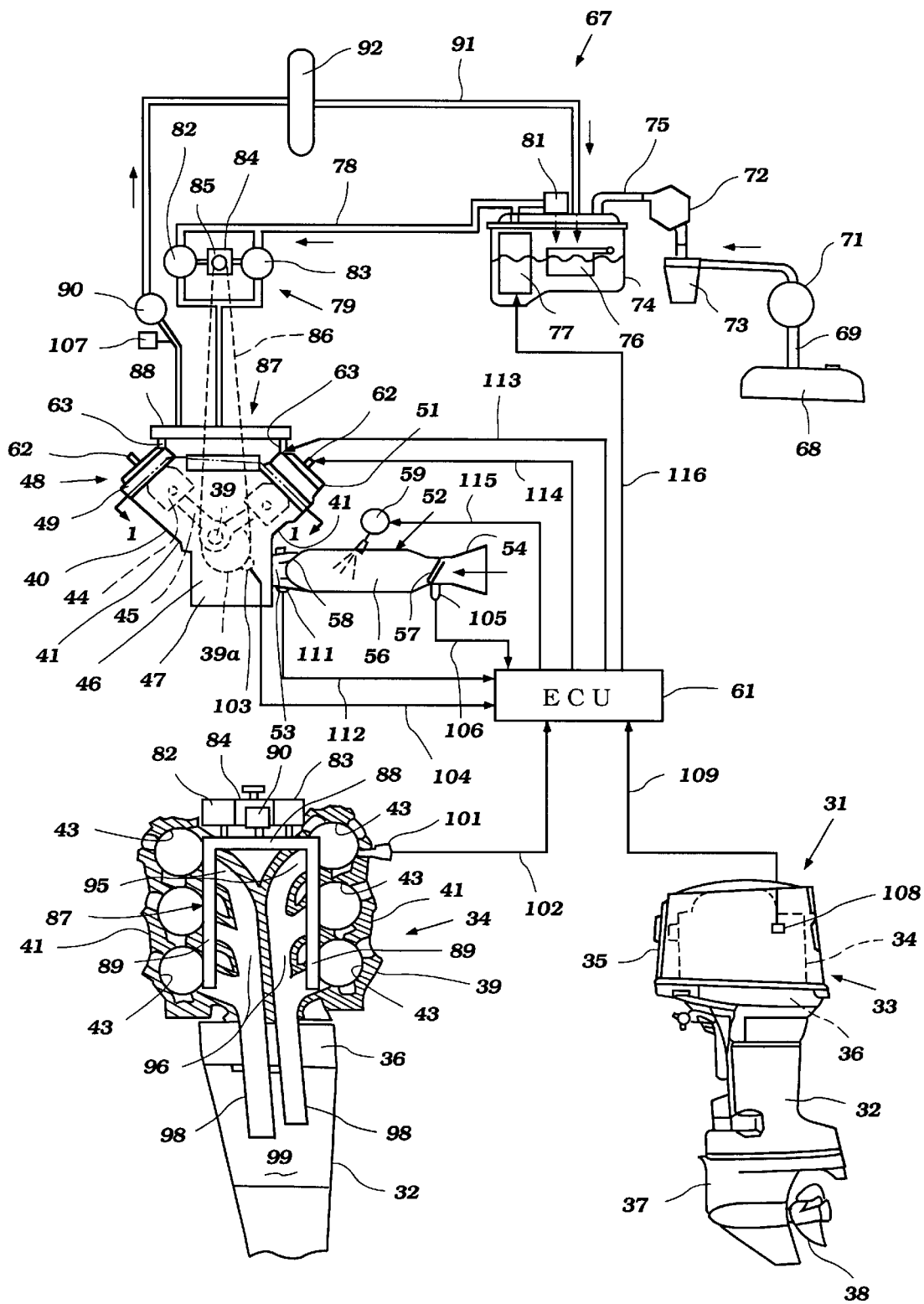
FIG. 14 is a multi-part view showing still another arrangement in which the construction shown in FIG. 1 is further provided with the resonators that are the same ones shown in FIGS. 10 and 12.

FIG. 14 illustrates still another arrangement in which the construction shown in FIG. 1 is further provided with the resonators that are the same ones shown in FIGS. 10 and 12. The same components or members as described in connection with the arrangement illustrated in FIGS. 1, 10 and 12 are assigned with the same reference numerals so as to avoid redundancy.

Figure 15:
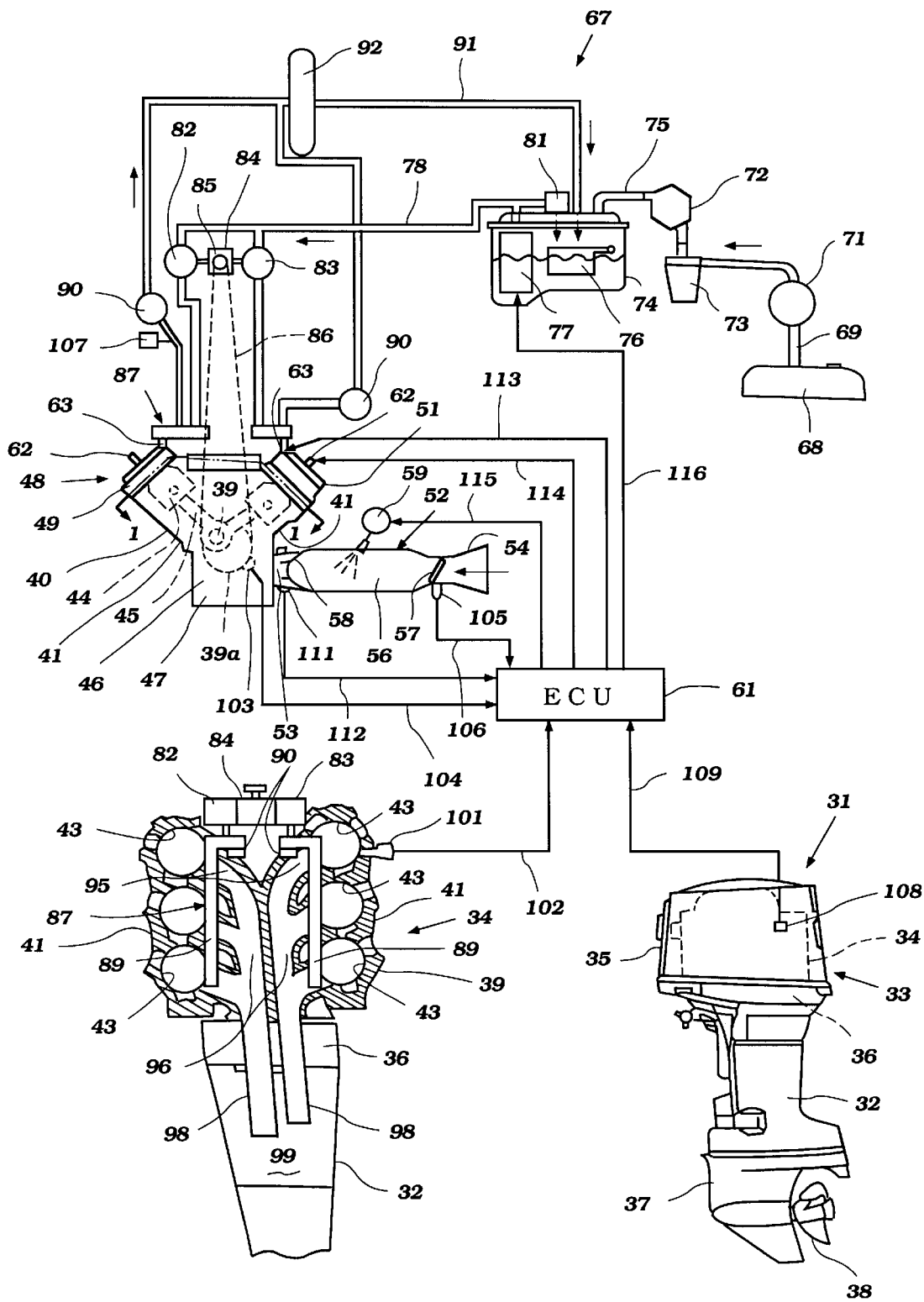
FIG. 15 is a multi-part view showing still another arrangement in which the construction shown in FIG. 13 is further provided with the resonators that are the same ones shown in FIGS. 10 and 12.

FIG. 15 illustrates still another arrangement in which the construction shown in FIG. 13 is further provided with the resonators that are the same ones shown in FIGS. 10 and 12. The same components or members as described in connection with the arrangement illustrated in FIGS. 10, 12 and 13 are assigned with the same reference numerals so as to avoid redundancy.

Figure 16:
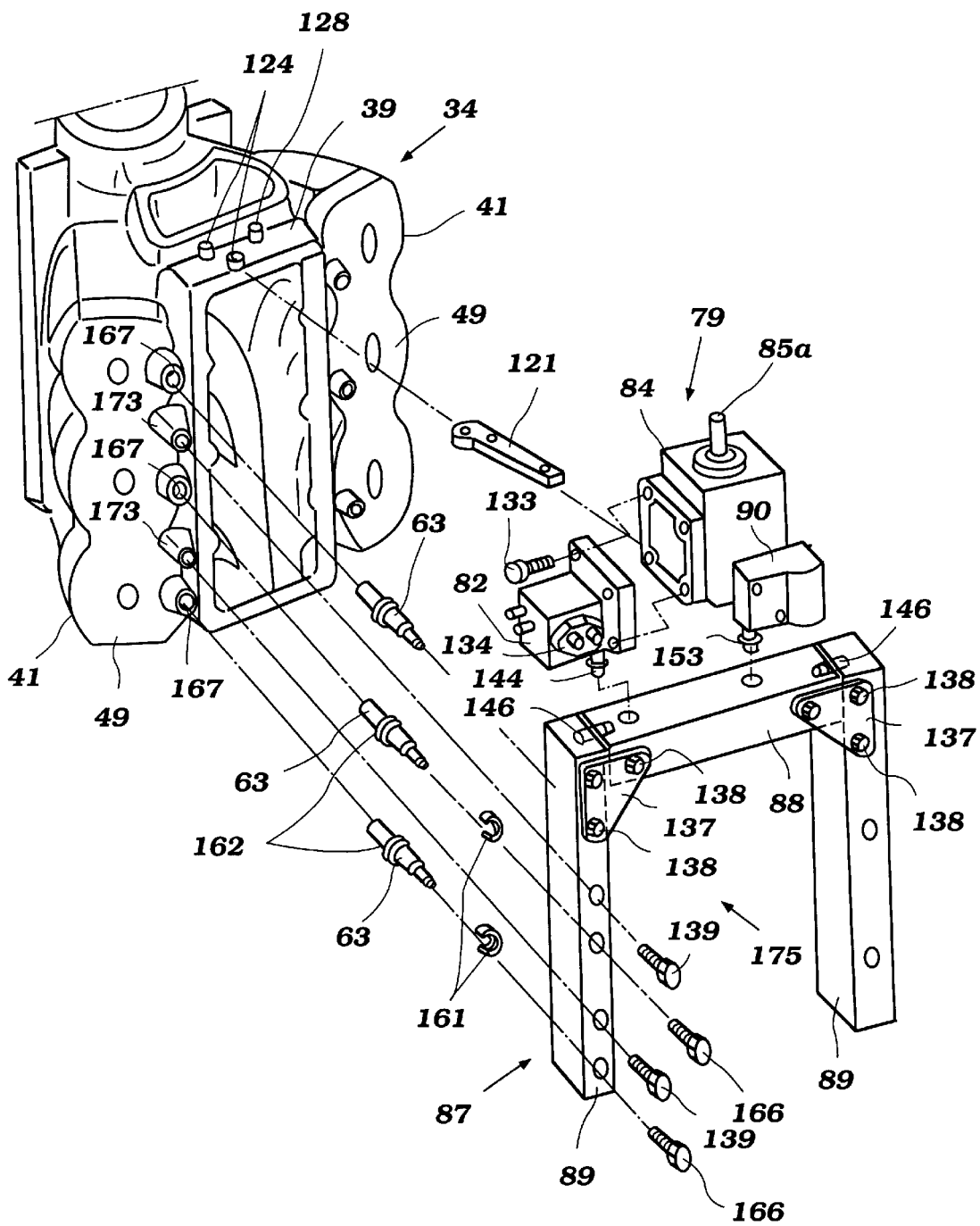
FIG. 16 is a perspective view showing yet another engine, in which related components exploded as shown in FIG. 7.

FIG. 16 illustrates yet another arrangement in which a single high pressure fuel pump is provided. The same components or members as described in connection with the arrangement illustrated in FIG. 7 are assigned with the same reference numerals so as to avoid redundancy.

Figure 17:
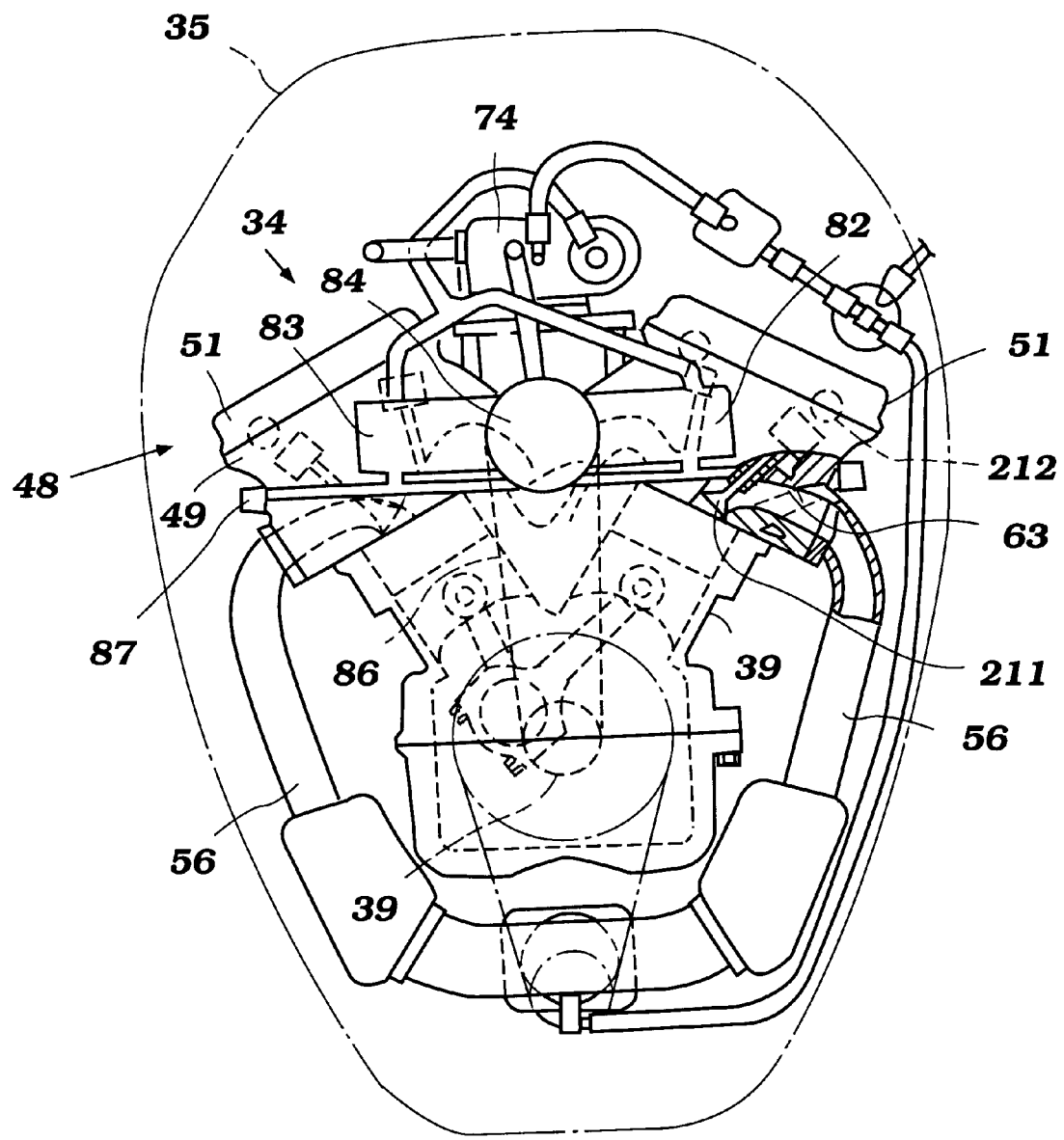
FIG. 17 is a top plan view of still another power head showing the engine in solid lines and the protective cowling in phantom.

FIG. 17 further illustrates still another arrangement in which the invention is embodied in four cycle engine for outboard motors. The same components or members as described in connection with the arrangement illustrated in FIG. 2 are assigned with the same reference numerals so as to avoid redundancy. However, special components for four cycle engine that are shown in FIG. 15 are an intake valve 211 and a camshaft 212.

As described above, in accordance with the preferred embodiments, two or more high pressure fuel pumps are allowed to be applied in the simple and compact nature even in a small space around the engine surrounded by a cowling. This also brings about advantages including that sufficient fuel can be supplied to fuel injectors without reforming a conventional fuel pump.

Another advantage is brought by the pump drive mechanism. A two cycle engine that has no camshaft is now permitted to incorporate high pressure fuel pumps.

Still another advantage comes from the pulsation damping means. Because of this, fluctuations in fuel pressure are smoothed and then control of the injection system can be improved.

Yet another advantage appears from the mounting structure in which at least the fuel supply conduit and the fuel pump drive mechanism are unified and this unit is affixed to the cylinder body by means of the pump drive mechanism. The structure, hence, has a good rigidity and affords easiness in assembling. Also, in that structure, the openings accommodating the fuel injectors are larger than the injectors themselves. This makes a gap between the opening and the injector and the gap can absorb the tolerances that accumulate in every related component. These advantages are particularly useful for outboard motors that are likely to have much vibration therein.

It should be noted that this invention is applicable not only to outboard motors but also to other various engines such as marine engines except for the outboard motors, lawn mower engines and stationary engines.

Of course, the foregoing description is that of preferred embodiments of the invention, and various changes and modifications may be made without departing from the spirit and scope of the invention, as defined by the appended claims.

What is claimed is:

1. A direct fuel injection system for a multi-cylinder internal combustion engine comprising a plurality of fuel injectors, a plurality of high pressure fuel pumps, a single fuel pump drive mechanism powered by said engine for driving said plurality of fuel pumps, said fuel pump drive mechanism being positioned between said fuel pumps, and a fuel supply conduit for supplying the fuel from said fuel pumps to said fuel injectors.

2. A direct fuel injection system as set forth in claim 1, wherein said fuel pumps comprise a pair of fuel pumps, and said fuel pump drive mechanism is interposed between them.

3. A direct fuel injection system as set forth in claim 1, wherein said fuel pumps are plunger-type pumps and each one of said fuel pumps includes a plunger, and said drive mechanism has a cam disc for pushing the respective plungers of said fuel pump alternately.

4. A direct fuel injection system as set forth in claim 3, wherein said cam disc has at least three and odd numbers of cams, said cams are disposed radially from the center of said cam disc, only one cam being placed on a line passing through the center of said cam disc.

5. A direct fuel injection system as set forth in claim 1, further comprising a pressure regulator, said pressure regulator being connected to said fuel supply conduit.

6. A direct fuel injection system as set forth in claim 1, wherein said engine has generally vertically spaced cylinders, said fuel supply conduit including a generally vertically extending fuel rail connected to said fuel injectors.

7. A direct fuel injection system as set forth in claim 1, wherein said engine powers a marine propulsion device.

8. A direct fuel injection system as set forth in claim 1, wherein said engine operates on a two cycle crankcase compression principle.

9. A direct fuel injection system as set forth in claim 1, wherein said engine operates on a four cycle principle.

10. A direct fuel injection system for a multi-cylinder internal combustion engine comprising a plurality of fuel injectors, a high pressure fuel pump, a fuel pump drive unit powered by said engine for driving said fuel pump, and a fuel supply conduit for supplying the fuel from said fuel pump to said fuel injectors, said fuel pump being mounted on said pump drive unit.

11. A direct fuel injection system as set forth in claim 10, wherein said engine has generally vertically spaced cylinders formed of two banks in a V arrangement, each bank of which is supplied with fuel from a respective one of pairs of vertically spaced fuel injectors, said fuel supply conduit including a generally horizontally disposed fuel manifold for collecting the fuel from said fuel pump, said fuel supply conduit further including a pair of generally vertically extending fuel rails depending from said fuel manifold for supplying the fuel to said fuel injectors of the respective banks.

12. A direct fuel injection system as set forth in claim 11, further including a pressure regulator connected to said fuel supply conduit.

13. A direct fuel injection system as set forth in claim 10, wherein said engine has a plurality of generally vertically spaced cylinders formed of two banks in a V arrangement, each bank of which is supplied with fuel from a respective one of pairs of vertically spaced fuel injectors, said fuel supply conduit including a pair of generally vertically extending fuel rails for collecting the fuel from said pump and supplying the fuel to said fuel injectors of the respective banks.

14. A direct fuel injection system as set forth claim 13, further comprising a plurality of pressure regulators, each one of said pressure regulators being connected to said each one of said fuel rails.

15. A direct fuel injection system as set forth in claim 10, wherein said engine powers a marine propulsion device.

16. A direct fuel injection system as set forth in claim 10, wherein said engine operates on a two cycle crankcase compression principle.

17. A direct fuel injection system as set forth in claim 10, wherein said engine operates on a four cycle principle.

18. A direct fuel injection system for a multi-cylinder internal combustion engine comprising a plurality of fuel injectors, a high pressure fuel pump, a fuel reservoir disposed upstream of said high pressure fuel pump, a pump drive mechanism for driving said fuel pump, a fuel supply conduit for supplying fuel from said fuel pump to said fuel injectors, said fuel supply conduit including at least one fuel rail having a pair of ends, one end being connected to the fuel pump, the other end being closed, said fuel injectors being attached to said fuel rails, a fuel return conduit for returning excess fuel to said fuel reservoir from a portion of said fuel supply conduit disposed upstream of the fuel injectors, and a pulsation damper being placed downstream of said fuel pump.

19. A direct fuel injection system as set forth in claim 18, wherein said pulsation damper is disposed at the end of said fuel rail.

20. A direct fuel injection system as set forth in claim 19, wherein said engine has generally vertically spaced cylinders, said fuel rail extending generally vertically along the spaced cylinders, said pulsation damper being disposed at the lowermost of said fuel rail.

21. A direct fuel injection system as set forth in claim 18, wherein said pulsation damper is disposed at the farthest position from said fuel pump.

22. A direct fuel injection system as set forth in claim 18, wherein said engine powers a marine propulsion device.

23. A direct fuel injection system as set forth in claim 18, wherein said engine operates on a two cycle crankcase compression principle.

24. A direct fuel injection system as set forth in claim 18, wherein said engine operates on a four cycle principle.

25. A direct fuel injection system for a multi-cylinder internal combustion engine having a cylinder body and a cylinder head affixed to said cylinder body for defining a plurality of combustion chambers between them, said fuel injection system comprising a plurality of fuel injectors for injecting fuel into said combustion chambers, a fuel pump, a pump drive unit for driving said fuel pump, and a fuel supply conduit for collecting the fuel from said fuel pump and supplying the fuel to said fuel injectors, said fuel supply conduit including a fuel rail, said cylinder head having a plurality of openings for receiving said fuel injectors, said fuel injectors being affixed to said fuel rail so that each one of said fuel injectors communicate with each one of said combustion chambers through said openings, said fuel rail being mounted on said cylinder body by said pump drive unit, and said respective openings being sufficiently larger than said respective fuel injectors so as to accommodate misalignment between said fuel rail and said fuel injectors.

26. A direct fuel injection system as set forth in claim 25, wherein each one of said openings has a seal member to fill a gap formed between each one of said openings and each one of said fuel injectors.

27. A direct fuel injection system as set forth in claim 26, wherein each one of said openings has a step for receiving a shoulder of each one of said fuel injectors and said seal member is provided between said step and said shoulder.

28. A direct fuel injection system as set forth in claim 27, wherein said seal member is made of elastic metal.

29. A direct fuel injection system as set forth in claim 25, wherein said fuel pump is mounted on said pump drive unit by fasteners.

30. A direct fuel injection system as set forth in claim 29, wherein said pump drive unit has fastener receiving openings that are sufficiently larger than said fasteners so as to accommodate misalignment between said pump drive unit and said fuel pump.

31. A direct fuel injection system as set forth in claim 25, wherein said fuel supply conduit is further affixed to said cylinder head.

32. A direct fuel injection system as set forth in claim 31, wherein said fuel rail is affixed to said cylinder head by fasteners, at least some of said fasteners being placed in close proximity to said fuel injectors.

33. A direct fuel injection system as set forth in claim 25, wherein said fuel injection system further comprises a pressure regulator, said pressure regulator being mounted on said pump drive unit.

34. A direct fuel injection system as set forth in claim 25, wherein said pump drive unit is affixed to a stay extending from said cylinder body.

35. A direct fuel injection system as set forth in claim 34, wherein said engine has generally vertically spaced cylinders formed of two banks in a V arrangement, said stay being placed between said banks.

36. A direct fuel injection system as set forth in claim 25, wherein said fuel pump has a unified fuel inlet and outlet module.

37. A direct fuel injection system as set forth in claim 25, wherein said fuel pump and said fuel rails are coupled together through a connecting member, respective connecting portions between said fuel pump and said connecting member and between said fuel rail and said connecting member being provided with at least one seal member.

38. A direct fuel injection system as set forth in claim 25, wherein said engine powers a marine propulsion device.

39. A direct fuel injection system as set forth in claim 25, wherein said engine operates on a two cycle crankcase compression principle.

40. A direct fuel injection system as set forth in claim 25, wherein said engine operates on a four cycle principle.

41. A direct fuel injection system for a multi-cylinder internal combustion engine having a cylinder body and a cylinder head affixed to said cylinder body for defining a plurality of combustion chambers between them, said fuel injection system comprising a plurality of fuel injectors for injecting fuel into said combustion chambers, a fuel pump, a pump drive unit for driving said fuel pump and fuel supply conduit for collecting the fuel from said fuel pump and supplying the fuel to said fuel injectors, said fuel supply conduit including a fuel rail, said fuel injectors being affixed to said fuel supply conduit so that each one of said fuel injectors communicate with a corresponding combustion chamber, said fuel pump and said fuel rail both being mounted on said pump drive unit, said pump drive unit being mounted on a portion of said engine.

42. A direct fuel injection system as set forth in claim 41, wherein said fuel rail is further affixed to another portion of said engine directly.

43. A direct fuel injection system as set forth in claim 41, further including a pressure regulator, said pressure regulator being mounted on said pump drive unit.

44. A direct fuel injection system as set forth in claim 1, wherein each one of said fuel pumps includes pump element, said fuel pump drive mechanism including an actuator arranged to move the respective pump elements.

45. A direct fuel injection system as set forth in claim 44, wherein said actuator moves the respective pump elements alternately so that pulsative pressure is generated in each one of the fuel pumps, and such that a phase of pulsative pressure in one of said fuel pumps is generally entirely inconsistent with a phase of another pulsative pressure in another one of said fuel pumps.

46. A multi-cylinder, internal combustion engine comprising a cylinder body defining a plurality of cylinder bores therein, a plurality of pistons each reciprocating within each one of the cylinder bores, a cylinder head affixed to the cylinder body and defining a plurality of combustion chambers with the cylinder bores and the pistons, a plurality of fuel injectors arranged to spray fuel for combustion in the combustion chambers, at least two fuel pumps arranged to supply the fuel to the fuel injectors, and a single drive unit arranged to drive the fuel pumps, the drive unit being positioned between the fuel pumps.

47. A multi-cylinder, internal combustion engine comprising a cylinder body defining a plurality of cylinder bores therein, a plurality of pistons each reciprocating within one of the cylinder bores, a cylinder head affixed to the cylinder body and defining a plurality of combustion chambers with the cylinder bores and the pistons, a plurality of fuel injectors arranged to spray fuel for combustion in the combustion chambers, a fuel pump arranged to supply the fuel to the fuel injectors, and a drive unit arranged to drive the fuel pump, the fuel pump being mounted on the pump drive unit.

48. A multi-cylinder, internal combustion engine comprising a cylinder body defining a plurality of cylinder bores therein, a plurality of pistons each reciprocating within one of the cylinder bores, a cylinder head affixed to the cylinder body and defining a plurality of combustion chambers with the cylinder bores and the pistons, a plurality of fuel injectors arranged to spray fuel for combustion in the combustion chambers, a fuel reservoir containing the fuel, a fuel supply passage configured to supply the fuel in the fuel reservoir to the fuel injectors, the fuel supply passage having a portion extending beyond the fuel injectors and being closed, a fuel pump disposed in the fuel supply passage and arranged to pressurize the fuel, a fuel return passage configured to return excess fuel to the fuel reservoir from a portion of the fuel supply passage positioned upstream of the fuel injectors, one of the fuel supply passage and the fuel return passage including a pressure regulator, and a pulsation damper disposed at one of a passage section extending between the fuel pump and the portion and another passage section extending between the pressure regulator and the portion.

49. A multi-cylinder, internal combustion engine comprising a cylinder body defining a plurality of cylinder bores therein, a plurality of pistons each reciprocating within one of the cylinder bores, a cylinder head affixed to the cylinder body and defining a plurality of combustion chambers with the cylinder bores and the pistons, a plurality of fuel injectors arranged to spray fuel for combustion in the combustion chambers, a fuel rail arranged to deliver the fuel to the fuel injectors, the fuel injectors being affixed to the fuel rail, a fuel pump arranged to pressurize the fuel, and a pump drive unit arranged to drive the fuel pump, the pump drive unit being mounted on the cylinder body, the fuel rail being mounted on the pump drive unit, the cylinder head having a plurality of openings for receiving the fuel injectors, and the respective openings being sufficiently larger than the respective fuel injectors so as to accommodate misalignment between the fuel rail and the fuel injectors.

50. A multi-cylinder, internal combustion engine comprising a cylinder body defining a plurality of cylinder bores therein, a plurality of pistons each reciprocating within one of the cylinder bores, a cylinder head affixed to the cylinder body and defining a plurality of combustion chambers with the cylinder bores and the pistons, a plurality of fuel injectors arranged to spray fuel for combustion in the combustion chambers, a fuel rail arranged to deliver the fuel to the fuel injectors, the fuel injectors being affixed to the fuel rail, a fuel pump arranged to pressurize the fuel, and a pump drive unit arranged to drive the fuel pump, the pump drive unit being mounted on one of the cylinder body and the cylinder head, both the fuel pump and the fuel rail being mounted on the pump drive unit.

51. A multi-cylinder, internal combustion engine as set forth in claim 50, wherein the fuel rail is further directly mounted on the cylinder head.

* * * * *